United States Patent [19]

Horgan et al.

[11] Patent Number: 5,954,617
[45] Date of Patent: Sep. 21, 1999

[54] SYSTEM FOR CONTROLLING INTERNAL COMBUSTION ENGINE PERFORMANCE IN ACCORDANCE WITH DRIVER BEHAVIOR

[75] Inventors: Matthew J. Horgan, Greenwood; Roger J. Hapka, Columbus, both of Ind.

[73] Assignee: Cummins Engine Company, Inc., Columbus, Ind.

[21] Appl. No.: 08/792,488

[22] Filed: Jan. 31, 1997

[51] Int. Cl.$^6$ .................................................. B60K 41/04
[52] U.S. Cl. ........................... 477/107; 477/111; 123/349
[58] Field of Search .................................. 477/107, 108, 477/110, 111; 123/349, 350, 352

[56] References Cited

U.S. PATENT DOCUMENTS

| | | |
|---|---|---|
| 4,174,765 | 11/1979 | Moshal et al. . |
| 4,178,580 | 12/1979 | Dombrowski . |
| 4,471,738 | 9/1984 | Smojver ............................. 123/349 X |
| 4,493,303 | 1/1985 | Thompson et al. ..................... 123/357 |
| 4,500,868 | 2/1985 | Tokitsu et al. . |
| 4,716,872 | 1/1988 | Pol ........................................ 123/352 |
| 4,899,280 | 2/1990 | Onari et al. . |
| 4,905,785 | 3/1990 | Kieffer et al. ...................... 123/352 X |
| 4,914,597 | 4/1990 | Moncelle et al. . |
| 5,041,811 | 8/1991 | Zarkowski . |
| 5,070,832 | 12/1991 | Hapka et al. . |
| 5,090,384 | 2/1992 | Ahlborn et al. ........................ 123/436 |
| 5,121,324 | 6/1992 | Rini et al. ............................ 123/349 X |
| 5,219,413 | 6/1993 | Lineberger ............................. 180/272 |
| 5,303,163 | 4/1994 | Ebaugh et al. . |
| 5,317,998 | 6/1994 | Hanson et al. ........................ 123/179.4 |
| 5,343,780 | 9/1994 | McDaniel et al. ..................... 477/108 |
| 5,394,136 | 2/1995 | Lammers et al. . |
| 5,477,827 | 12/1995 | Wiesman, II et al. .................. 123/436 |
| 5,601,511 | 2/1997 | Michioka ........................... 477/110 X |
| 5,673,668 | 10/1997 | Pallett et al. ....................... 123/349 X |

FOREIGN PATENT DOCUMENTS

| | | |
|---|---|---|
| 0265526 | 5/1988 | European Pat. Off. . |
| 0383593 | 8/1990 | European Pat. Off. . |
| 0581558 | 2/1994 | European Pat. Off. . |
| 2209854 | 5/1989 | United Kingdom . |
| 2285876 | 7/1995 | United Kingdom . |

*Primary Examiner*—Charles A Marmor
*Assistant Examiner*—Sherry Lynn Estremsky
*Attorney, Agent, or Firm*—Woodard, Emhardt, Naughton, Moriarty & McNett

[57] ABSTRACT

A system for controlling internal combustion engine performance in accordance with driver behavior includes a vehicle control computer operable to receive a plurality of vehicle operating parameter signals and control engine fueling based thereon. In accordance with an operational status, or an operational state determined over a predefined time interval, of one or more of the vehicle operating parameter signals, the system is operable to control available engine performance. Both the operational status and operational state of the various vehicle operating parameters are the result of the manner in which the driver operates the vehicle. The control system of the present invention is thus operable to reward/penalize driver performance by correspondingly adding/subtracting available engine performance in the form of available engine output power and/or available vehicle speed. Preferably, subtracting available engine performance occurs automatically, and adding available engine performance may be either done automatically or according to driver demand.

16 Claims, 10 Drawing Sheets

SYSTEM FOR CONTROLLING INTERNAL COMBUSTION ENGINE PERFORMANCE IN ACCORDANCE WITH DRIVER BEHAVIOR

FIELD OF THE INVENTION

The present invention relates generally to systems for encouraging motor vehicle operators to achieve preset fuel economy goals, and more specifically to such systems for controlling engine performance in furtherance of such goals.

BACKGROUND OF THE INVENTION

Motor vehicle fleets are typically formed of special purpose vehicles such as taxis, buses and sales/service vehicles, as well as product delivery/shipping vehicles such as medium and heavy duty trucks, to name a few. Such fleet vehicles may or may not have different drivers periodically assigned thereto, and in any case the driving skills of fleet drivers typically vary widely. Thus, while some drivers operate their fleet vehicles in a manner that is consistent with fleet vehicle operating goals, others do not. Fleet owners and/or operators have thus devised numerous techniques and systems to control and encourage proper operation of the fleet vehicles.

An example of one known approach for encouraging such proper operation of a fleet vehicle involves utilizing a trip recorder which is operable to collect vehicle and engine operating conditions during vehicle operation. The vehicle and engine operating data is recorded onto suitable media during vehicle operation, and is thereafter removed from the vehicle and downloaded by suitable means. A trip report is typically generated from the downloaded data which is reviewed by the fleet owner and/or manager. In cases where the trip report indicates that the driver's performance meets or exceeds certain operating goals, such as preestablished fleet fuel economy goals, the driver becomes eligible for some type performance award.

While the foregoing approach has been used in the past with some success, it has several drawbacks associated therewith. For example, the driver's award is typically received days and often weeks after the driving performance. This delay tends to diminish the importance of proper vehicle operation to many drivers. Moreover, the awards are typically recognition type awards or cash/goods which do not relate directly to the operation of the vehicle. Further, this approach serves only to reward drivers that operate the fleet vehicles in accordance with certain fleet operating goals, and does not penalize driving performance that is inconsistent with such goals.

U.S. Pat. No. 5,394,136 to Lammers et al. addresses the first of the foregoing drawbacks by disclosing a satellite communication system operable to immediately notify and reward a driver that is operating a vehicle in accordance with predetermined vehicle operating goals. However, such a system does not address either of the remaining example drawbacks discussed above.

U.S. Pat. No. 5,477,827 to Weisman, II et al. attempts to address the first two of the drawbacks discussed above by disclosing a control system which has an ultimate goal of maximizing fuel economy. The system is operable to increase the vehicle speed available to the driver as fuel economy increases, wherein the upper limit on the allowable vehicle speed is increased proportionally to an amount that a threshold fuel economy is exceeded. While such an increase in fuel economy is disclosed as possibly being the result of minimization of idle time, selection of optimum transmission gears, maintaining a steady throttle or reducing the use of engine-driven accessory loads, "fuel economy" is measured in the Weisman et al. system either in accordance with a trip average MPG or a filtered MPG value utilizing a lag calculation.

While the Weisman et al. system goes further in addressing the driver reward system drawbacks discussed hereinabove, it has its own drawbacks associated therewith. For example, the Weisman et al. system discloses only adding vehicle speed to reward fuel economic vehicle operation, and does not address any type of penalization approach for deterring vehicle operation resulting in poor fuel economy. Moreover, the Weisman et al. "fuel economy" calculations are quite limited in that they are based solely on MPG calculations. Further, the Weisman et al. system discloses adding vehicle speed only and contains no mention of alternatively adding to, or increasing, a different engine performance parameter.

U.S. Pat. No. 4,914,597 to Moncelle et al. addresses some of the drawbacks discussed hereinabove in that it discloses a system for adjusting engine output power based on the operational status of a vehicle cruise control system. Specifically, Moncelle et al. discloses operating the engine in accordance with a first set of engine output torque curves when cruise control is not engaged, and in accordance with a second set of higher engine output torque curves when cruise control is engaged. However, while the Moncelle et al. system addresses some of the drawbacks associated with prior art systems as discussed hereinabove, this system also has shortcomings associated therewith. For example, the level of engine output power is based solely on the operational status of the cruise control system and does not take into account any other engine and/or vehicle operating parameter that may affect vehicle fuel economy. Moreover, this system, as with all other prior art systems discussed above, fails to provide the fleet owner/manager with programming flexibility to set limits for the vehicle operating parameters and/or driver rewards, choose among one or more vehicle operating parameters on which a driver reward/penalty is based, or choose between a number of possible engine and/or vehicle operation-based performance rewards or penalties.

What is therefore needed is a flexible system for controlling engine performance according to driver behavior. Such a system should preferably reward compliance with predefined vehicle operational goals and penalize noncompliance therewith, and should further preferably provide the fleet owner/manager with maximum flexibility in programming parameters and parameter values associated with such a system.

SUMMARY OF THE INVENTION

Many of the shortcomings described in the BACKGROUND section are addressed by the present invention. The present invention includes a vehicle control computer operable to receive a plurality of vehicle operating parameter signals and control engine fueling in accordance therewith. Based on either an operational status, or operational performance over a predefined time interval, of one or more of the vehicle operating parameter signals, the control system of the present invention is operable to control available engine performance in accordance therewith. Available engine performance may take the form of available engine output power and/or available vehicle speed, as well as any of a number of alternative engine performance parameters. In any case, both the operational status and operational performance of the various vehicle operating parameter signals are linked directly to driver behavior, i.e. the manner in which the driver operates the vehicle. Accordingly, the present invention is operable to increase available engine performance if the operational status or operational performance of one or more of the vehicle operating parameter signals is consistent with predefined vehicle operational goals, and to decrease available engine performance if the operational status or operational performance of the one or more vehicle operating parameters is inconsistent with the predefined vehicle operational goals.

In accordance with one embodiment of the present invention, a functional relationship is established between an operational status, and/or operational performance over a predefined time period, of one or more of the vehicle operating parameter signals and an engine performance parameter such as engine output power and/or available vehicle speed. The one or more vehicle operating parameters, corresponding engine performance parameter (s), and functional relationship therebetween are either contained within a memory portion of the vehicle control computer or programmable therein by a fleet owner/manager. During subsequent vehicle operation, the one or more vehicle operating parameter signals are monitored and available engine performance is automatically adjusted, by increasing or decreasing available engine performance, according to a comparison between the operational status and/or operational performance of the one or more vehicle operating parameter signals and the established functional relationship.

In accordance with another embodiment of the present invention, a functional relationship is established between an operational status, and/or operational performance over a predefined time period, of one or more of the vehicle operating parameter signals and a time-based reward/penalty for subsequent adjustment of an engine performance parameter such as engine output power and/or available vehicle speed. The one or more vehicle operating parameters, corresponding engine performance parameter (s), and functional relationship therebetween are either contained within a memory portion of the vehicle control computer or programmable therein by a fleet owner/manager. During subsequent vehicle operation, the one or more vehicle operating parameter signals are monitored and a performance time period is automatically accumulated according to a comparison between the operational status and/or operational performance of the one or more vehicle operating parameter signals and the established functional relationship. Preferably, any decrease in available engine performance, corresponding to penalty time for unacceptable driver performance, is instituted automatically for the duration of the penalty time. Any increase in available engine performance, corresponding to reward time for acceptable or exceptional driver performance, may be either instituted automatically or may accumulate as available high performance engine operation time, and preferably be displayed, as such in the cab area of the vehicle. Upon driver demand, high performance engine operation may then be selected. In this way, high performance engine operation may be "saved" for situations in which the driver desires such high performance. One object of the present invention is to provide an improved driver incentive system that automatically controls available engine performance in accordance with driver behavior, thereby encouraging drivers to operate their vehicles in accordance with predefined vehicle operational goals.

Another object of the present invention is to provide such a system wherein available engine performance is controlled by increasing available engine output power and/or available vehicle speed, or by controlling alternative engine performance parameters, as a reward for operating the vehicle in accordance with the predefined operational goals, and by decreasing available engine output power and/or available vehicle speed, or by controlling alternative engine performance parameters, as a penalty for failing to operate the vehicle in accordance with the predefined operational goals.

Yet another object of the present invention is to provide such a system wherein a reward time period is awarded for acceptable or exceptional vehicle operation and a penalty time period is assessed for unacceptable vehicle operation.

Still another object of the present invention is to provide such a system wherein available engine performance is automatically decreased based on any accumulated penalty time, and available engine performance is either automatically increased based on any accumulated reward time, or is increased upon driver demand therefore.

These and other objects of the present invention will become more apparent from the following description of the preferred embodiment.

DESCRIPTION OF THE PREFERRED EMBODIMENTS

Figure 1:
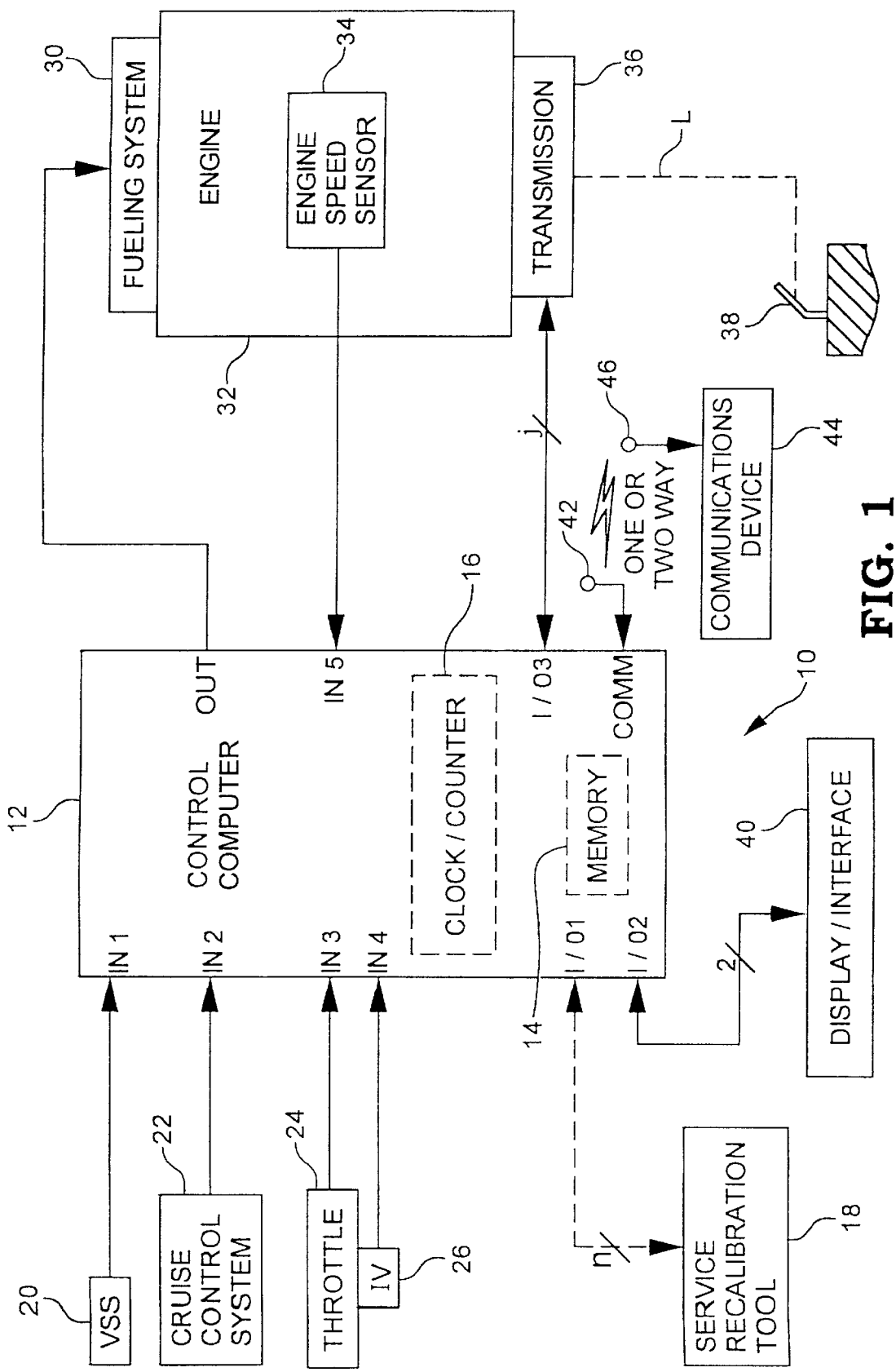
FIG. 1 is a diagrammatic illustration of one embodiment of a control system of the present invention for controlling internal combustion engine performance in accordance with driver behavior.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring to FIG. 1, a control system 10 for controlling internal combustion engine performance based on driver behavior, in accordance with a preferred embodiment of the present invention, is shown. Central to control system 10 is a control computer 12 which is preferably a microprocessor-based vehicle control computer operable to control a plurality of engine and vehicle related functions as is known in the art. It is to be understood, however, that control computer 12 may be any known computer operable to receive one or more digital and/or analog input signals, process these signals in accordance with a desired algorithm, and provide one or more corresponding digital and/or analog output signals. In one embodiment, control computer 12 includes a Motorola 68336 or equivalent microprocessor.

Control computer 12 further includes a memory 14 internal to control computer 12 as shown, although the present invention contemplates that additional, or supplemental, memory may be provided external to control computer 12 and operably connected thereto as is known in the art. Optionally, as will be discussed in greater detail hereinafter, control computer 12 may include a clock or counter 16, although the present invention contemplates providing such a clock/counter external to control computer 12 which is operably connected thereto as is known in the art.

Control computer 12 includes a first input/output port I/O1 which is connectable to a service/recalibration tool 18 via a number, n, of signal paths. Service/recalibration tool 18 is preferably a known programming tool commonly used in the automotive industry for programming and/or reprogramming control computer 12 with calibration information, software algorithms, and the like, without removing control computer 12 from the vehicle. Control computer 12 also includes a communications port COMM connected to an antenna 42 or similar signal receiving/transmitting mechanism. A wireless communications device 44 having an antenna 46 or similar signal receiving/transmitting mechanism is also included for one or two way communications with control computer 12. Communications device 44 is preferably a known radio transmitter/receiver, cellular telephone or the like, and is operable to send and receive calibration information, software algorithms and the like to control computer 12. In this manner, control computer 12 may be programmed or reprogrammed from a remote location and control computer may similarly send vehicle operational data, in real-time, to the remotely located communications device 44.

Control computer 12 includes a number of input ports capable of receiving digital and/or analog inputs from a variety of vehicle sensors and systems as is known in the art, wherein computer 12 is operable to convert any such analog signals to digital signals prior to processing thereof. For example, control system 10 includes a vehicle speed sensor 20 which is operable to sense vehicle speed and provide a vehicle speed signal corresponding thereto at input IN1 of control computer 12. Sensor 20 is preferably a known sensor operable to sense rotational speed of the vehicle tailshaft (not shown), although the present invention contemplates utilizing other known sensor arrangements for determining vehicle speed such as, for example, a wheel speed sensor. Control system 10 further includes a vehicle cruise control system 22 which is operable, as is known in the art, to automatically control vehicle speed above a threshold vehicle speed. Cruise control system 22 is connected to control computer 12 at input IN2, and provides a cruise control status signal thereto corresponding to either an active or inactive operational status of the cruise control system 22. Control computer 12 is responsive to the cruise control status signal, as well as other signals provided thereto by cruise control system 22, to control engine fueling in accordance therewith.

A manually controlled throttle 24 is connected to input IN3 of control computer 12, which is responsive to driver actuation thereof to control engine fueling. Preferably, throttle 24 is a known electromechanical throttle pedal which is responsive to force applied thereto to provide a corresponding signal at IN3 indicative of throttle position or percentage. In one embodiment, throttle 24 includes an idle validation switch 26 associated therewith which is operable to provide a redundant signal to input IN4 of control computer 12 indicative of either a "closed" or "open" throttle condition as is known in the art. For example, below a predefined position or percentage of throttle 24, idle validation switch 26 provides a signal indicative of a throttle "closed" condition which corresponds to an idle condition of the engine, and above the predefined position or percentage of throttle 24, idle validation switch 26 provides a signal indicative of a throttle "open" condition.

Regardless of the mechanism by which engine fueling is controlled (i.e. either by manually actuated throttle 24 or cruise control system 22), control computer 12 provides an engine fueling signal at output OUT which is, in turn, connected to the fueling system 30 of internal combustion engine 32. As is known in the art, a cruise control governor provides the engine fueling signal in cruise control mode of operation, and a road speed governor provides the engine fueling signal under manual throttle control. Preferably, engine 32 is a diesel engine for use in a medium or heavy duty truck, although the present invention contemplates that engine 32 may be any internal combustion engine. In any case, engine 32 includes a known engine speed sensor 34 connected to input IN5 of control computer 12 which is operable to provide an engine speed signal thereto.

Control computer 12 is operable to supply a fueling signal to fueling system 30 according to throttle demand provided by either cruise control system 22 or manually controlled throttle 24 as described hereinabove. In so doing, memory 14 of control computer 12 typically includes one or more fueling rate calibrations, or maps, therein which control computer 12 utilizes in providing a fueling rate signal to speed governor 28 (either cruise control governor or road speed governor). Engine output power, or output torque, is defined by such fueling rate calibrations. The fueling rate signal is then processed by the appropriate speed governor and provided as a fueling signal to fueling system 30 of engine 32. Either speed governor typically utilizes the engine speed signal provided by engine speed sensor 34 as a feedback signal thereto for further controlling the fueling signal provided to fueling system 30 as is known in the art. Vehicle speed is thus typically controlled by a combination of the particular fueling rate calibration and appropriate speed governor in response to a desired throttle position or percentage as commanded by either throttle 24 or cruise control system 22.

Engine 32 is connected to a transmission 36 which includes a plurality of selectable gears that are engageable with a rotatable output shaft of the engine (not shown) as is known in the art. Transmission 36 may include a number of manually selectable gears, in which case a gear shift lever 38 is typically positioned in the cab area of the vehicle and is mechanically coupled to transmission 36 via linkage L. Transmission 36 may further include a number of automatically selectable gears, wherein control computer 12 is operable, as is known in the art, to control the shifting of transmission 36 between such automatically selectable gears. Alternatively, transmission 36 may be a completely automated transmission, wherein gear shift lever 38 and linkage L are omitted, and wherein control computer 12 is operable to control all transmission gear shifting. In the event that transmission 36 includes any such automatically selectable gears, control computer 12 includes an input/output port I/O3 connected thereto via a number, j, of signal paths. Control computer 12 is thus operable to control the automatic shifting of transmission 36 through at least some of these signal paths as is known in the art.

Regardless of the particular type of transmission 36 used, control computer 12 is preferably operable to determine which of the plurality of selectable gears is presently engaged with the engine 32 by computing a ratio of engine speed, provided by engine speed sensor 34, to vehicle speed, provided by vehicle speed sensor 20. Alternatively, transmission 36 may be provided with a plurality of micro switches therein (not shown) which provide corresponding signals back to I/O3 of control computer 12 indicative of the presently engaged transmission gear. As a further alternative, transmission 36 may include a separate microprocessor-based computer operable to determine the presently engaged transmission gear in accordance with known techniques. For example, such a separate computer may be connected to some of the j signal paths which comprise an SAE J1939 datalink. According to the SAE J1939 bus industry standard, the control computer 12, as well as the computer associated with the transmission 36, may send and receive thereon data relating to the operational parameters of the engine, vehicle and/or transmission. With such an arrangement, the computer associated with the transmission may receive signals from control computer 12 via the J1939 datalink, which are indicative of vehicle speed and engine speed, and proceed to compute the presently engaged transmission gear from a ratio thereof, which information is then provided back to control computer 12 via the J1939 datalink. In any event, it is to be understood that the present invention contemplates that control computer 12 may use any known technique for determining the presently engaged gear of transmission 36, as well as any known technique for monitoring a shift sequence of transmission 36.

Control system 10 preferably further includes a display/interface monitor 40 located in the cab area of the vehicle which is connected to control computer 12 at input/output port I/O2. Display/interface 40 is operable to receive information from control computer 12, display such information in real time, and include one or more driver actuatable switches for sending certain commands back to control computer 12 as will be discussed in greater detail hereinafter. While the present invention contemplates that any known display/interface device meeting the above criteria may be used, display/interface device 40 is preferably a RoadRelay™ monitoring and display device designed by Cummins Engine Company, Inc. of Columbus, Ind., which is described in U.S. Pat. No. 5,303,163 entitled CONFIGURABLE VEHICLE MONITORING SYSTEM, which issued Apr. 12, 1994 to Ebaugh et al and is assigned to the assignee of the present invention, the contents of which are incorporated herein by reference.

In accordance with the present invention, control system 10 is operable to adjust available engine performance, by adjusting an engine performance parameter, based on a comparison between one or more vehicle operating parameters and predetermined operational states of the one or more vehicle operating parameters. As used herein, the term "engine performance parameter" is defined as engine output power (alternatively, engine output torque) or vehicle speed, wherein vehicle speed may include any of manually controlled vehicle speed (via throttle 24), cruise controlled vehicle speed (via cruise control system 24) and/or gear down vehicle speed, or alternatively any of a number of performance related engine and/or vehicle operational parameters as will be described in greater detail hereinafter. Gear down vehicle speed, as this term is known in the art, refers to various vehicle speed ranges allowable by control computer 12 when engine 32 is engaged with any gear of transmission 36 other than the numerically highest, or "top," gear. The term "available engine performance", as used herein, is defined as an upper allowable limit of an engine performance parameter at any given time. Thus, for example, for a maximum cruise controlled vehicle speed of 65 mph, the "engine performance parameter" refers to cruise controlled vehicle speed, and the "available engine performance" refers to a maximum cruise controlled vehicle speed of 65 mph. The term "adjusting" as it is used herein with reference to either "available engine performance" or "engine performance parameter", is defined as either increasing or decreasing available engine performance or the value of the engine performance parameter, preferably in a manner as discussed hereinabove with respect to the fueling rate calibration determinations, vehicle speed governor control, as well as engine idle shutdown, engine auto start/stop control, and progressive shifting control as will be described more fully hereinafter.

As described hereinabove, the term "engine performance parameter" is defined as encompassing any of a number of performance related engine and/or vehicle operational parameters such as engine output power and/or vehicle speed. Another example of such a performance related operational parameter is idle shutdown capability. As is known in the art, control computer 12 may be configured to automatically shutdown the engine upon detection of a continuous engine idling condition for a predefined time period. In accordance with the present invention, idle shutdown capability may be disabled as a reward for desirable driver performance, and may be enabled as a penalty for undesirable driver performance.

An example of yet another performance related operational parameter is idle shutdown override capability. As in known in the art, idle shutdown systems may be equipped with driver override capability. Such systems typically provide some type of warning, such as flashing lights or the like, some time prior to shutting down the engine. The driver may then defeat idle shutdown by actuating the throttle pedal 24 and/or some other predefined vehicle device prior to actual engine shutdown. In accordance with the present invention, idle shutdown override may be automatically enabled as a reward for desirable driver performance, or disabled as a penalty for undesirable driver performance.

Still another example of a performance related operational parameter is idle capability during power-take-off (PTO) operation (known in the art as fast idle). As is known in the art, control computer 12 may be configured to either enable or disable engine idle during PTO operation. In accordance with the present invention, engine idle during PTO operation may be enabled as a reward for desirable driver performance, or disabled as a penalty for undesirable driver performance.

Yet another example of a performance related operational parameter is one or more ambient air idle shutdown temperature limits. As is known in the art, control computer 12 may be programmed to provide for different engine idle shutdown operational modes depending on ambient temperature. By way of example, control computer 12 may be programmed with three temperature limits wherein engine idle shutdown capability is disabled when ambient temperature is below the lowest temperature limit, the driver has the ability to override idle shutdown, as discussed hereinabove, between the lower and middle temperature limits, engine shutdown capability is enabled and engine shutdown override capability is disabled between the middle and upper temperatures, and the driver may again override engine shutdown above the upper temperature limit. In accordance with the present invention, the ambient air idle shutdown temperature limits may be suitably modified as a reward for desirable driver performance or as a penalty for undesirable driver performance. For example, as a reward for desirable driver performance, the temperature range in which idle shutdown override capability is disabled may be reduced. Conversely, as a penalty for undesirable driver performance, the lower temperature limit below which idle shutdown capability is disabled may be decreased to a lower temperature.

Still another example of a performance related operational parameter is either a set point or hysteresis range of a cab or bunk temperature limit below which the engine automatically starts to maintain the cab or bunk at a desired temperature level. As is known in the art, control computer 12 may be programmed to automatically start and shutdown the engine in order to maintain certain engine and/or vehicle operating parameters within predefined limits or ranges. One example vehicle operating parameter is the interior cab or bunk temperature of a heavy duty truck. Below a programmed bunk temperature, the engine 32 automatically starts so that the cab heating/cooling system (not shown) turns on to modulate the bunk temperature toward the predefined temperature level. Such a system typically has a programmed temperature hysteresis defining a temperature range above and below the desired bunk temperature. In order to start or shutdown the engine 32, the actual bunk temperature must be outside the temperature hysteresis range. In accordance with the present invention, the desired temperature limit may be raised during cold weather or lowered during warm weather, or the hysteresis temperature range may be reduced, as a reward for desirable driver performance, and the desired bunk temperature may be lowered during cold weather and raised during warm weather, or the hysteresis temperature range may be expanded, as a penalty for undesirable driver performance.

Still a further example of a performance related operational parameter is progressive shifting capability or modification of progressive shifting RPM limits. As is known in the art, control computer 12 may be configured to set upper engine RPM limits for each of the plurality of selectable gears of transmission 36. Thus, in each of the selectable transmission gears, the driver is permitted to increase engine RPM, via throttle control as discussed hereinabove, up to a predefined engine RPM limit, wherein such limits may be different for different transmission gears. In accordance with the present invention, such progressive shifting operation may be disabled, or the allowable engine RPM limits increased for desirable driver performance, and progressive shifting operation may be enabled, or the corresponding engine RPM limits lowered, for undesirable driver performance.

In each of the preceding examples, the driver reward or penalty is instituted automatically depending on the status or performance history of one or more "vehicle operating parameters". The term "vehicle operating parameter", as used herein, is defined as any driver-controllable operating parameter associated with the vehicle and/or engine that affects a predefined vehicle/engine performance variable such as, for example, overall fuel economy. The term "predefined operational state" of a vehicle operating parameter, as used herein, is defined as either operation of the vehicle operating parameter within a predefined range of operational states thereof, and/or operation of the vehicle operating parameter below or above a predefined value of the vehicle operating parameter.

One example of a vehicle operating parameter monitored by control system 10 is percentage of engine idle time. This parameter may be determined in accordance with any of a number of techniques. According to one technique, control computer 12 continuously monitors an engine speed signal provided to input IN5 by engine speed sensor 34. Any engine speed below a predefined engine speed defines an engine idling condition, and any engine speed above the predefined engine speed defines a non-idling condition of the engine. Control computer 12 is operable to compute percentage of engine idle time over a predefined time interval as the percentage of time that the engine speed corresponds to an engine idling condition.

According to another technique for determining percentage of idle time, control computer 12 continuously monitors a throttle position signal provided to input IN3 by throttle 24. Any throttle position below a predefined throttle position defines the engine idling condition, and any throttle position above the predefined throttle position defines a non-idling condition of the engine. Control computer 12 is operable to compute percentage of engine idle time over a predefined time interval as the percentage of time that the throttle position corresponds to an engine idling condition.

According to yet another technique for determining percentage of idle time, control computer 12 continuously monitors the status of idle validation switch 26 provided to input IN4 thereof. An active state of the idle validation switch 26 defines the engine idling condition, and an inactive state of switch 26 defines a non-idling condition of the engine. Control computer 12 is operable to compute percentage of engine idle time over a predefined time interval as the percentage of time that the idle validation switch 26 is active.

According to a further technique for determining percentage of idle time, control computer 12 continuously monitors a vehicle speed signal provided thereto by vehicle speed sensor 20. Any vehicle speed below a predefined vehicle speed defines an engine idling condition, and any vehicle speed above the predefined vehicle speed defines an engine non-idling condition. Preferably, the predefined vehicle speed is set at zero mph, although the present invention contemplates other predefined vehicle speeds as the idling condition vehicle speed threshold. In any event, control computer 12 is operable to compute percentage of idle time over a predefined time interval as the percentage of time that the vehicle speed corresponds to an engine idling condition.

It is to be understood that the present invention contemplates utilizing other known techniques for determining percentage of engine idling time. Regardless of the particular technique used, however, control system 10 is operable to increase available engine performance if the percentage of engine idle time determined over a predefined time interval is less than a threshold value, and to decrease available engine performance if the percentage of engine idle time determined over the predefined time interval is greater than the threshold value. In this manner, drivers will be rewarded with increased engine performance for minimizing their engine idle time, and will be conversely penalized for unacceptably high engine idle time with decreased engine performance. Since significantly reducing engine idle time has a greater impact on fuel economy than does a small, but noticeable, increase in available engine performance, the overall fuel economy of the vehicle is increased by utilizing the concepts of the present invention.

Another example of a vehicle operating parameter monitored by control system 10 is the percentage of time that engine speed exceeds a predefined engine speed limit. In accordance with this example, control computer 12 continuously monitors an engine speed signal provided to input IN5 by engine speed sensor 34 as previously discussed. Control computer 12 is operable to compute percentage of excessive engine speed time over a predefined time interval as the percentage of time that the engine speed exceeds an excessive engine speed threshold. Control system 10 is then operable to increase available engine performance if the percentage of excessive engine speed time determined over a predefined time interval is less than a threshold value, and to decrease available engine performance if the percentage of excessive engine speed time determined over the predefined time interval is greater than the threshold value. Drivers are thus rewarded with increased engine performance for minimizing excessive engine speed time, and are conversely penalized for frequently operating the vehicle at excessive engine speeds.

Yet another example of a vehicle operating parameter monitored by control system 10 is the distance traveled by the vehicle per unit of fuel used by the engine, which parameter is preferably in the form of an accumulated mile-per-gallon or trip mpg. In accordance with this example, control computer 12 continuously monitors fuel consumption and distance traveled by the vehicle, using known techniques, and computes a trip mpg accordingly. Control system 10 is then operable to increase available engine performance if the accumulated trip mpg is greater than a threshold value, and to decrease available engine performance if the accumulated trip mpg is less than the threshold value. Drivers are thus rewarded with increased engine performance for fuel efficient vehicle operation, and are conversely penalized for fuel inefficient vehicle operation.

Still another example of a vehicle operating parameter monitored by control system 10 is the time or distance of vehicle operation wherein a numerically highest gear of the transmission is engaged with the engine. In accordance with this example, control computer 12 continuously computes the presently engaged transmission gear, utilizing one or more of the techniques described hereinabove, and computes the percentage of time over a predefined time interval, or percentage of distance of a predefined distance, that the numerically highest gear of the transmission is engaged with the engine. Control system 10 is then operable to increase available engine performance if the percentage of time (or distance) that the numerically highest gear of the transmission is engaged with the engine over a predefined time (or distance) interval is greater than a threshold value, and to decrease available engine performance if the percentage of time (or distance) that the numerically highest gear of the transmission is engaged with the engine over the predefined time (or distance) interval is less than the threshold value. As another example of an engine performance control which may be used in accordance with the present invention, control system 10 may be operable to increase allowable vehicle speed only in one or more of the lower gears if the percentage of time (or distance) that the numerically highest gear of the transmission is engage with the engine over the predefined time (or distance)interval is greater than the threshold value. Conversely, control system 10 may be operable to decrease allowable vehicle speed only in one or more of the lower gears if the percentage of time (or distance) that the numerically highest gear of the transmission is engaged with the engine over the predefined time (or distance) interval is less than the threshold value. In either case, drivers are thus rewarded with increased engine performance for maximizing operating time or distance in top gear, and are conversely penalized for excessively operating the vehicle in other than top gear.

A further example of a vehicle operating parameter monitored by control system 10 is rapid deceleration. In accordance with this example, control computer 12 continuously monitors the vehicle speed signal provided by vehicle speed sensor 20 at input IN1 thereof, and computes vehicle deceleration therefrom according to known techniques. Control system 10 is then operable to increase available engine performance if the vehicle deceleration rate exceeds a predefined deceleration rate less than a predetermined number of times over a predefined time period, and decreases available engine performance if the vehicle deceleration rate exceeds the predefined deceleration rate more than the predetermined number of times over the predefined time period. Drivers are thus rewarded with increased engine performance for minimizing rapid deceleration events, such as panic stops, and are conversely penalized for excessive numbers of rapid deceleration events.

Still a further example of a vehicle operating parameter monitored by control system 10 is the average vehicle speed over a predefined time interval of engine and vehicle operation. In accordance with this example, control computer 12 continuously monitors the vehicle speed signal provided by vehicle speed sensor 20 at input IN1 thereof, and increases available engine performance if the average vehicle speed is below a predefined speed value, and decreases available engine performance if the average vehicle speed is greater than the predefined speed value during engine and vehicle operation. Drivers are thus rewarded with increased engine performance for operating the vehicle below a predefined average vehicle, and are conversely penalized for excessive average vehicle speed.

Still a further example of a vehicle operating parameter monitored by control system 10 is vehicle acceleration rate. In accordance with this example, control computer 12 continuously monitors the vehicle speed signal provided by vehicle speed sensor 20 at input IN1 thereof, and computes vehicle acceleration therefrom according to known techniques. Control system 10 is then operable to increase available engine performance if the vehicle acceleration rate exceeds a predefined acceleration rate less than a predetermined number of times over a predefined time period, and decreases available engine performance if the vehicle acceleration rate exceeds the predefined acceleration rate more than the predetermined number of times over the predefined time period. Drivers are thus rewarded with increased engine performance for operating the vehicle according to fuel efficient acceleration rates, and are conversely penalized for operating the vehicle with excessive acceleration rates.

Still a further example of a vehicle operating parameter monitored by control system 10 is excessive proximity warnings. In accordance with this example, the vehicle is equipped with a number of proximity sensors (not shown) which provide control computer 12 with proximity warning signals when the vehicle comes excessively close to another object. Control computer 12 monitors the proximity sensors and increases engine performance if less than a predefined number of proximity warning signals are detected over a predetermined time interval, and decreases engine performance if more than the predefined number of proximity warning signals are detected over the predetermined time interval. Drivers are thus rewarded with increased engine performance for avoiding collisions or rear collisions, and are conversely penalized with decreased engine performance for excessive proximity warnings.

Figure 2A:
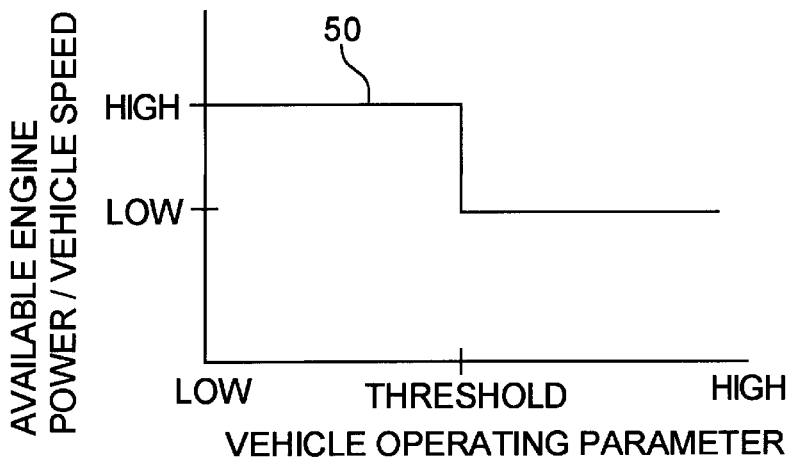
FIG. 2A is plot of engine power/vehicle speed versus a vehicle operating parameter for controlling engine performance in accordance with one embodiment of the present invention.
Figure 2B:
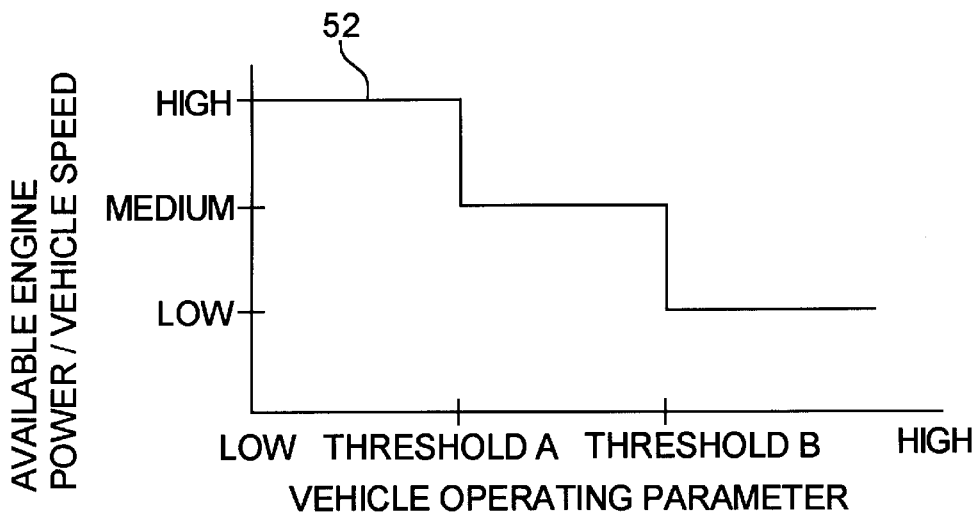
FIG. 2B is plot of engine power/vehicle speed versus a vehicle operating parameter for controlling engine performance in accordance with another embodiment of the present invention.
Figure 2C:
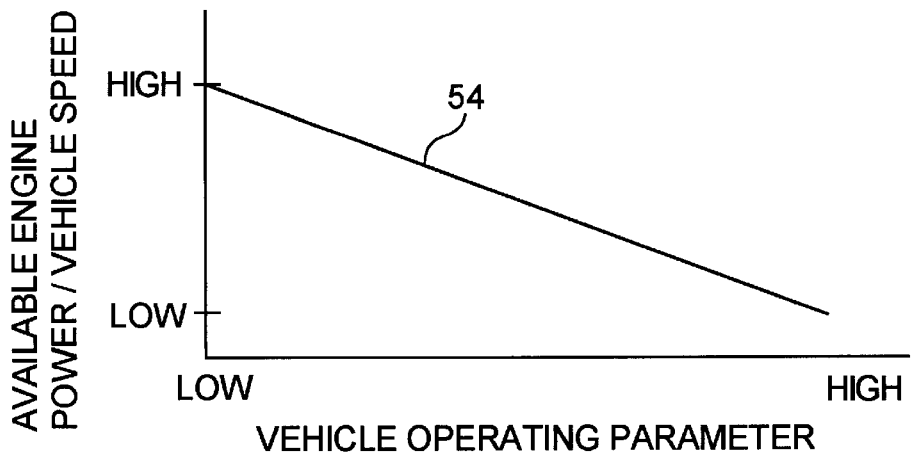
FIG. 2C is plot of engine power/vehicle speed versus a vehicle operating parameter for controlling engine performance in accordance with yet another embodiment of the present invention.

In accordance with another aspect of the present invention, a functional relationship is established between the predefined operational state of the vehicle operating parameter and a corresponding state or value of the engine performance parameter. The monitored value of the vehicle operating parameter is then compared to this functional relationship in determining the actual adjustment of the engine operating parameter. One embodiment of the present invention for providing such a functional relationship is illustrated in FIGS. 2A–2C which define available engine performance as a direct function of the vehicle operating parameter according to a number of alternative techniques. Referring to FIG. 2A, one preferred technique for defining available engine performance 50 as a direct function of the vehicle operating parameter is shown. As shown in FIG. 2A, the vehicle operating parameter defines a threshold value thereof between a low vehicle operating parameter value and a high vehicle operating parameter. Below this vehicle operating parameter threshold, available engine performance 50 is set at a high level thereof, and above the threshold available engine performance 50 is set at a low level thereof.

Referring now to FIG. 2B, an alternate technique for defining available engine performance 52 as a direct function of the vehicle operating parameter is shown. FIG. 2B includes two distinct vehicle operating parameter threshold levels, threshold A and threshold B, between the low and high values thereof. Below threshold A, available engine performance 52 is set at a high level thereof. Between threshold A and threshold B, available engine performance 52 is set at a medium level thereof. Above threshold B, available engine performance 52 is set at a low level thereof. While only two such vehicle operating parameter threshold levels are illustrated in FIG. 2B, it is to be understood that the present invention contemplates that any number of vehicle operating parameter threshold levels may be used to define the functional relationship illustrated in FIG. 2B.

Referring now to FIG. 2C, another alternate technique for defining available engine performance 54 as a direct function of the vehicle operating parameter is shown. FIG. 2C illustrates that the functional relationship between vehicle operating parameter and available engine performance need not define a series of discrete engine performance levels, but may rather define a continuous function 54 that decreases with increasing vehicle operating parameter values. It bears pointing out that the function illustrated in FIG. 2C need not be entirely linear as shown, but may alternatively be non-linear and/or piece-wise linear.

It is to be understood that while the available engine performance functions illustrated in FIGS. 2A–2C generally decrease as the vehicle operating parameter value increases, the available engine performance functions could alternatively be made to generally increase as the vehicle operating parameter value increases. An example of a situation in which a decreasing function might be used is when the vehicle operating parameter is percentage of engine idle time as discussed hereinabove. On the other hand, an example of a situation in which an increasing function might be used is when the vehicle operating parameter is trip mpg as discussed hereinabove.

Figure 3A:
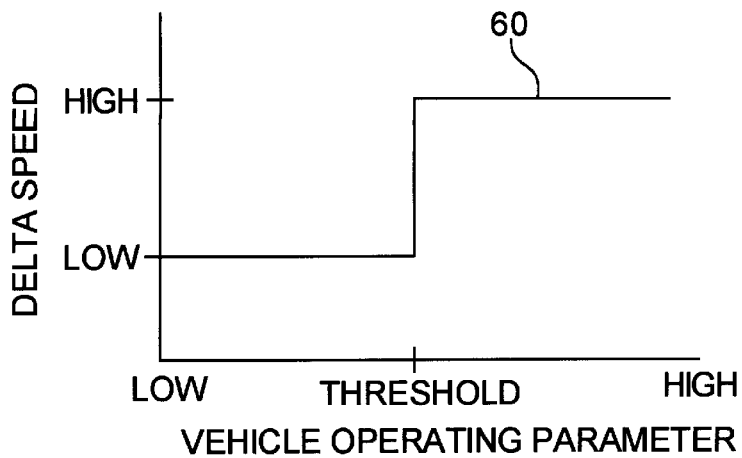
FIG. 3A is a plot of vehicle speed differential versus a vehicle operating parameter for controlling engine performance in accordance with a further embodiment of the present invention.
Figure 3B:
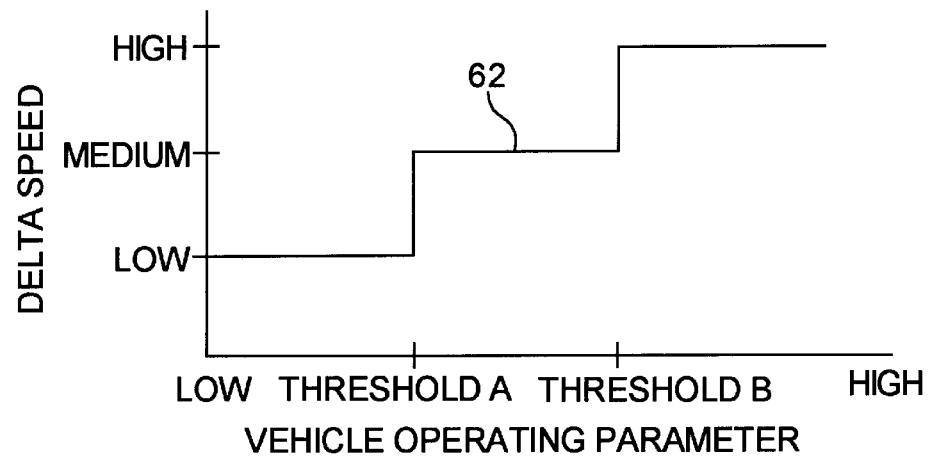
FIG. 3B is a plot of vehicle speed differential versus a vehicle operating parameter for controlling engine performance in accordance with a yet a further embodiment of the present invention.
Figure 3C:
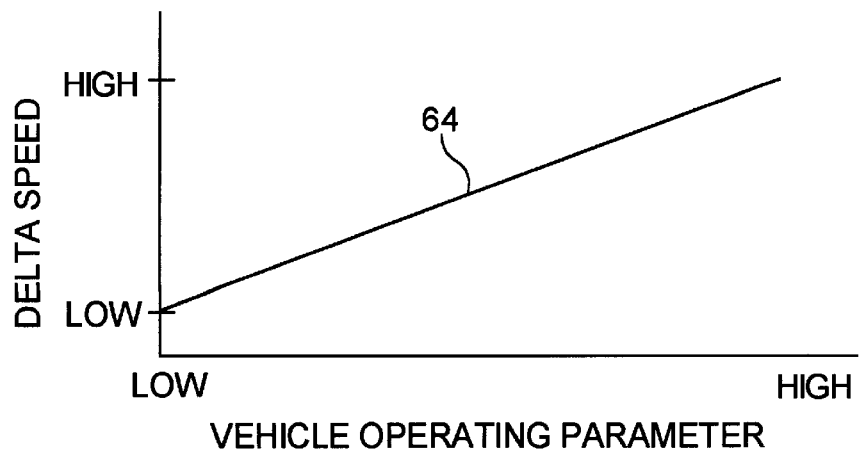
FIG. 3C is a plot of vehicle speed differential versus a vehicle operating parameter for controlling engine performance in accordance with a still a further embodiment of the present invention.

Another embodiment of the present invention for defining a functional relationship between the predefined operational state of the vehicle operating parameter and a corresponding value of the engine performance parameter is shown in FIGS. 3A–3C which define available engine performance, in the form of a speed delta variable, as a function of the vehicle operating parameter according to a number of alternative techniques. In this embodiment, control system 10 is operable to continuously monitor the vehicle speed signal provided thereto at input IN1 by vehicle speed sensor 20, and compute a learned speed therefrom corresponding to an average vehicle speed over a most recent time period. If the instantaneous vehicle speed has decreased by a predetermined delta speed value from the learned speed and the throttle demand (provided by throttle 24 or cruise control system 22) is above a predefined throttle demand value, then control system 10 is operable to fuel the engine according to a higher horsepower fueling rate calibration curve. This fueling technique is known and is intended to maintain constant vehicle speeds through various road grade deviations. An example of a system employing one embodiment of the foregoing technique is disclosed in U.S. Pat. No. 5,343,780, entitled VARIABLE POWER DRIVETRAIN ENGINE CONTROL SYSTEM, which issued Sep. 6, 1994 to McDaniel et al. and is assigned to the assignee of the present invention, the contents of which are incorporated herein by reference.

In accordance with the present invention, the delta speed value discussed above may be made variable depending upon the performance of one or more vehicle operating parameters. Generally, if the monitored vehicle operating parameter values are consistent with vehicle operational goals, the driver is rewarded with a smaller delta speed value, which corresponds to a smaller decrease in vehicle speed before switching to higher engine horsepower capability. Conversely, if the monitored vehicle operating parameter values are not consistent with vehicle operational goals, the driver is penalized with a larger delta speed value, which corresponds to a larger decrease in vehicle speed before switching to higher engine horsepower capability.

Referring to FIG. 3A, one preferred technique for defining available engine performance in the form of a delta speed variable 60 as a function of the vehicle operating parameter is shown. As shown in FIG. 3A, the vehicle operating parameter defines a threshold value thereof between a low vehicle operating parameter value and a high vehicle operating parameter. Below this vehicle operating parameter threshold, delta speed 60 is set at a low value thereof, and above this threshold, delta speed 60 is set at a high value thereof.

Referring now to FIG. 3B, an alternate technique for defining available engine performance in the form of a delta speed variable 62 as a function of the vehicle operating parameter is shown. FIG. 3B includes two distinct vehicle operating parameter threshold levels, threshold A and threshold B, between the low and high values thereof. Below threshold A, delta speed 62 is set at a low level thereof. Between threshold A and threshold B, delta speed 62 is set at a medium level thereof. Above threshold B, delta speed 62 is set at a high level thereof. While only two such vehicle operating parameter threshold levels are illustrated in FIG. 3B, it is to be understood that the present invention contemplates that any number of vehicle operating parameter threshold levels may be used to define the functional relationship illustrated in FIG. 3B.

Referring now to FIG. 3C, another alternate technique for defining available engine performance in the form of delta speed 64 as a function of the vehicle operating parameter is shown. FIG. 3C illustrates that the functional relationship between vehicle operating parameter and delta speed need not define a series of discrete delta speed levels, but may rather define a continuous function 64 that increases with increasing vehicle operating parameter values. It bears pointing out that the function illustrated in FIG. 3C need not be entirely linear as shown, but may alternatively be non-linear and/or piece-wise linear.

It is to be understood that while the delta speed functions illustrated in FIGS. 3A–3C generally increase as the vehicle operating parameter value increases, the delta speed functions could alternatively be made to generally decrease as the vehicle operating parameter value increases. An example of a situation in which an increasing function might be used is when the vehicle operating parameter is percentage of engine idle time as discussed hereinabove. On the other hand, an example of a situation in which a decreasing function might be used is when the vehicle operating parameter is trip mpg as discussed hereinabove.

Figure 4A:
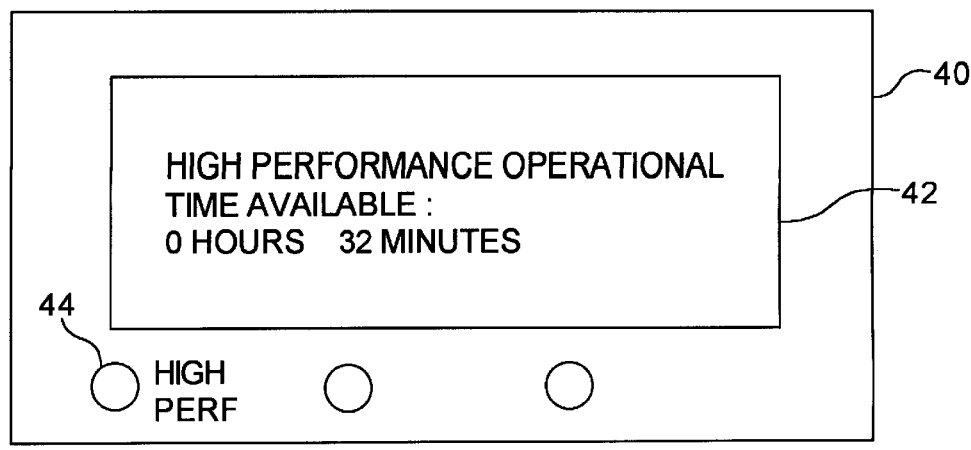
FIG. 4A is a diagrammatic illustration of an example incab display for displaying available increased engine performance time in accordance with a still another embodiment of the present invention.
Figure 4B:
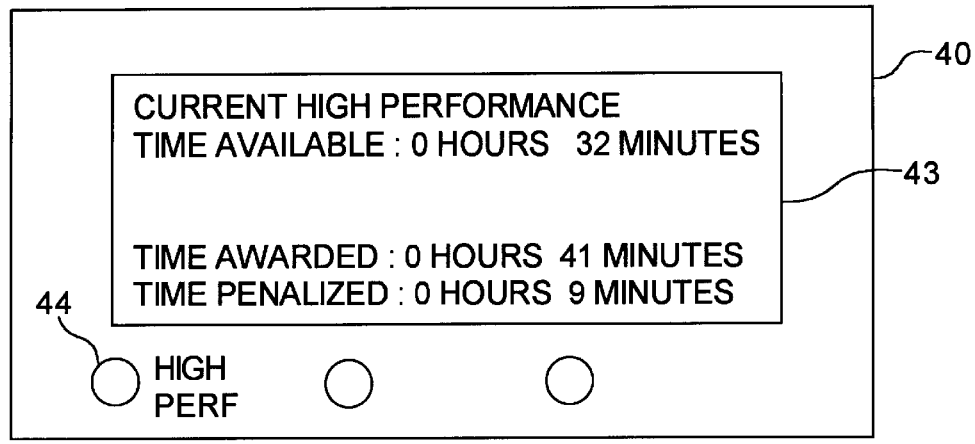
FIG. 4B is a diagrammatic illustration of an alternate example in-cab display for displaying available increased engine performance time similar to the display illustrated in FIG. 4A.
Figure 4C:
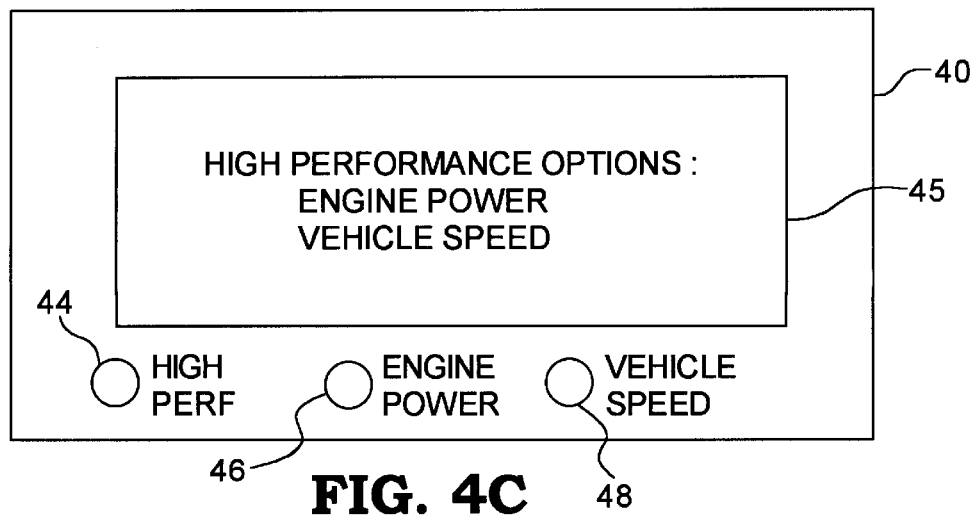
FIG. 4C is a diagrammatic illustration of an optional incab display for use in supplementing either of the displays illustrated in FIGS. 4A and 4B.

Yet another embodiment of the present invention for defining a functional relationship between the predefined operational state of the vehicle operating parameter and a corresponding value of the engine performance parameter is shown in FIGS. 4A–4C which defines available engine performance, in the form of award/penalization time, as a function of the vehicle operating parameter. In this embodiment, control system 10 is operable to award a predefined time period of increased available engine performance if the monitored vehicle operating parameter values are consistent with vehicle operational goals, and assess a predefined time period of decreased available engine performance if the monitored vehicle operating parameter values are not consistent with vehicle operational goals. Control system 10 may automatically increase/decrease available engine performance based on an accumulated value of the award/penalization time in accordance with one embodiment of the present invention. In another embodiment, display/interface 40 (FIG. 1) includes a driver actuatable high engine performance switch 44 which provides the driver with the ability to selectively operate the vehicle with increased engine performance at the driver's discretion, while the control system 10 is automatically operable to decrease available engine performance based on an accumulated penalization time amount. In this manner, the driver may "bank", or accumulate, increased available engine performance time, and select increased engine performance operation as needed or desired based on road conditions or other criteria, whereas accumulated penalty time is assessed automatically in the form of decreased engine performance.

Referring to FIG. 4A, one embodiment of a display 42 of display/interface 40 for controlling available engine performance according to accumulated award/penalty time is shown. In the embodiment shown in FIG. 4A, display 42 provides, an indication of the amount of time of increased available engine performance. At any time during vehicle operation, the driver may actuate switch 44, in which case control system 10 is operable to accordingly increase available engine performance. In this embodiment, control computer 12 must include, or have access to, a clock/counter 16 so that control computer 12 may decrement the available increased available engine performance time while switch 44 is actuated. In the event that switch 44 is deactivated, or increased available engine performance time expires, control computer 12 is operable to return available engine performance to its default value. Although FIG. 4A shows high performance operational time available in hours and minutes, the present invention contemplates that such high performance time may alternatively be accumulated and displayed in any combination of hours, minutes and/or seconds, or as available high performance distance (i.e. miles) available.

Referring now to FIG. 4B, an alternate embodiment of a display 43 of display/interface 40 is shown which displays an accumulated time value of increased available engine performance, and further includes display information relating to a value of awarded time (time award for increased available engine performance) as well as a value of penalization time (time penalty for decreased available engine performance). As illustrated in FIG. 4B, control computer 12 is preferably operable to compute the accumulated time value of increased available engine performance as simply the time awarded minus the time penalized. However, the present invention further contemplates computing the accumulated time value of increased available engine performance according to other functions of award and penalization time. One example of such an alternative function might be to compute the accumulated time value of increased available engine performance as the time awarded minus twice the time penalized. It is intended that other functions may be used to ultimately determine the accumulated time value of increased available engine performance without detracting from the scope of the present invention.

Referring now to FIG. 4C, display/interface 40 may include an optional display 45 and corresponding optional switches 46 and 48. As illustrated in FIG. 4C, optional display 45 provides the driver with a choice of the manner in which the increased available engine performance may be manifested. For example, display 45 includes, as increased available engine performance options, either engine output power or vehicle speed as these terms are defined hereinabove. The driver may accordingly choose to manifest any increased available engine performance as increased engine power by actuating switch 46 in the presence of display 45, or as increased vehicle speed by actuating switch 48 in the presence of display 45.

In accordance with another aspect of the present invention, the functional relationships involving available engine performance discussed hereinabove may include more than one vehicle operating parameter. For example, the functional relationship between available engine performance and vehicle operating parameter discussed with reference to FIGS. 2A–2C and 3A–3C may be defined as available engine performance being a function of a number of logically connected vehicle operating parameters. An example of such a multiple vehicle operating parameter function is shown in Table I, which shows the resulting available engine performance adjustment in terms of adjustments in the various alternative available engine performance variables discussed hereinabove. While the only logical connector shown in Table I is the AND connector, it is to be understood that any of the known logical connectors, i.e. OR, NOR, NAND, etc., may be used to define the desired functional relationship. It should further be understood that the particular vehicle operating parameters and all numerical values listed in Table I are shown only for example purposes, and that any number and combination of vehicle operating parameters discussed hereinabove may be used to define the functional relationship, and that any desired numerical values may be used in defining such a functional relationship.

TABLE I

| Trip MPG (mpg) | Logical Connector | Idle Time (%) | Vehicle Speed Adjust (mph) | Speed Delta Adjust (mph) | Engine Power Available (HP) |
|---|---|---|---|---|---|
| ≧6.5 | AND | ≦10 | 1.0 | −1.0 | 370 |
| ≧6.0 | AND | ≦20 | 0.0 | 0.0 | 350 |
| ≧5.5 | AND | ≦30 | −3.0 | 1.0 | 330 |
| ≧5.0 | AND | ≦40 | −5.0 | 2.0 | 330 |

As another example, the functional relationship between accumulated available engine performance time and vehicle operating parameter discussed with reference to FIGS. 4A–4C may be defined as accumulated available engine performance being a function of a number of logically connected vehicle operating parameters. An example of such a multiple vehicle operating parameter function is shown in Table II, which shows the resulting accumulated available engine performance time in terms of minutes awarded/ penalized. Again, while the only logical connector shown in Table II is the AND connector, it is to be understood that any of the known logical connectors, i.e. OR, NOR, NAND, etc., may be used to define the desired functional relationship. It should further be understood that the particular vehicle operating parameters and all numerical values listed in Table II are again shown only for example purposes, and that any number and combination of vehicle operating parameters discussed hereinabove may be used to define the functional relationship, and that any desired numerical values may be used in defining such a functional relationship.

TABLE II

| Trip MPG (mpg) | Logical Connector | Idle Time (%) | Time Award/Penalty (minutes) |
|---|---|---|---|
| ≧6.5 | AND | ≦10 | 5.0 |
| ≧6.0 | AND | ≦20 | 0.0 |
| ≧5.5 | AND | ≦30 | −7.0 |
| ≧5.0 | AND | ≦40 | −15.0 |

While the present invention contemplates that all vehicle operating parameters, engine performance parameters and functional relationships therebetween, as well as all numerical values associated therewith, may be provided in memory 14 (FIG. 1) by the vehicle manufacturer, such values are preferably programmable into memory 14 via the service/ recalibration tool 18 by, for example, the fleet owner/ manager. This feature of the present invention provides the fleet owner/manager with the flexibility to tailor available engine performance to the particular needs and goals of the fleet.

Figure 5:
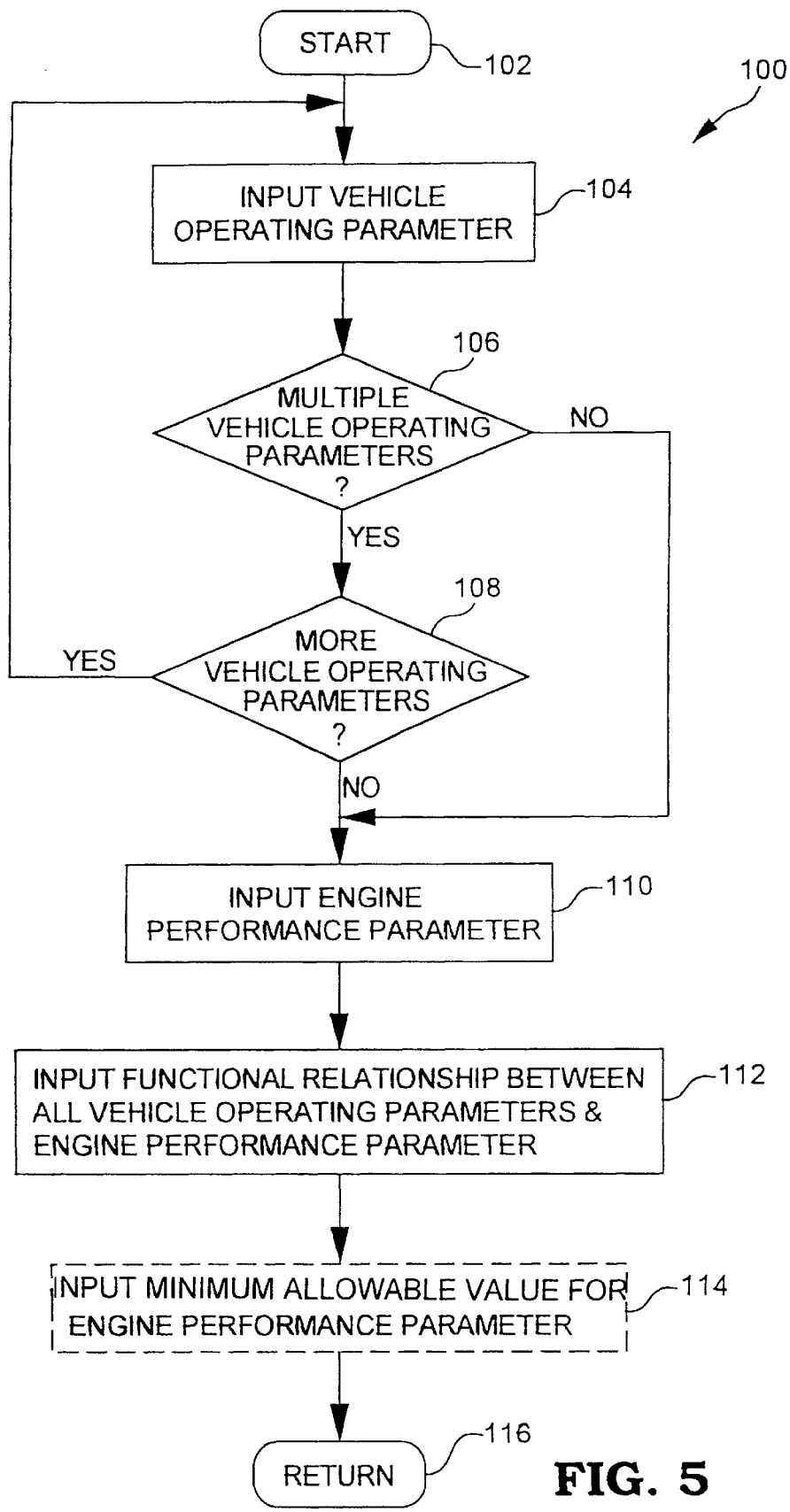
FIG. 5 is a flowchart illustrating one embodiment of a software algorithm for programming a vehicle control computer for operation in accordance with the present invention.

Referring now to FIG. 5, a flowchart is shown illustrating one embodiment of a software algorithm 100 for programming memory 14 of control computer 12 for subsequent operation of control system 10 in accordance with either of the embodiments illustrated in FIGS. 2A–2C and 3A–3C. Algorithm 100 starts at step 102 and at step 104, a vehicle operating parameter is input into memory 14 of control computer 12. Thereafter at step 106, algorithm 100 tests whether multiple vehicle operating parameters are required. If so, algorithm execution continues at step 108, and if only a single vehicle operating parameter is required, algorithm execution continues at step 110. If multiple vehicle operating parameters are required, algorithm 100 tests, at step 108, whether all vehicle operating parameters have been input or whether more vehicle operating parameters are required. If more vehicle operating parameters are required at step 108, algorithm execution loops back to step 104 where an additional vehicle operating parameter is programmed into memory 14 of control computer 12.

If no additional vehicle operating parameters are required at step 108, or if only a single vehicle operating parameter is required at step 106, the engine performance parameter is programmed into memory 14 at step 110. As discussed hereinabove, the engine performance parameter may, in accordance with the present invention, be one of engine output power or vehicle speed. Thereafter at step 112, a functional relationship between all vehicle operating parameters and the engine performance parameter, as discussed hereinabove, is programmed into memory 14 of control computer 12.

Algorithm 100 may optionally continue from step 112 to step 114 where a minimum allowable value for the engine performance parameter is programmed into memory 14 of control computer 12. Algorithm execution continues from step 114, or from step 112 if step 114 is not included, to step 116 where algorithm execution is returned to its calling routine, or to an algorithm managing portion of control computer 12. In accordance with yet another aspect of the present invention, step 114 may be included to establish a minimum value of the engine performance parameter below which available engine performance may not be adjusted. In this manner, control system 10 is programmed to achieve at least a predefined fuel economy level regardless of subsequent driver operation of the vehicle. In operation of the vehicle, the driver may be rewarded with increased available engine performance for operating the vehicle in accordance with predefined vehicle operational goals, and may be penalized with decreased available engine performance for operating the vehicle in a manner that is not consistent with the predefined vehicle operational goals as discussed herein. However, in accordance with the present aspect of the invention, available engine performance may not be decreased below a predefined level of available engine performance so that even the most poorly performing drivers will be guaranteed at least a minimum level of available engine performance.

Figure 6:
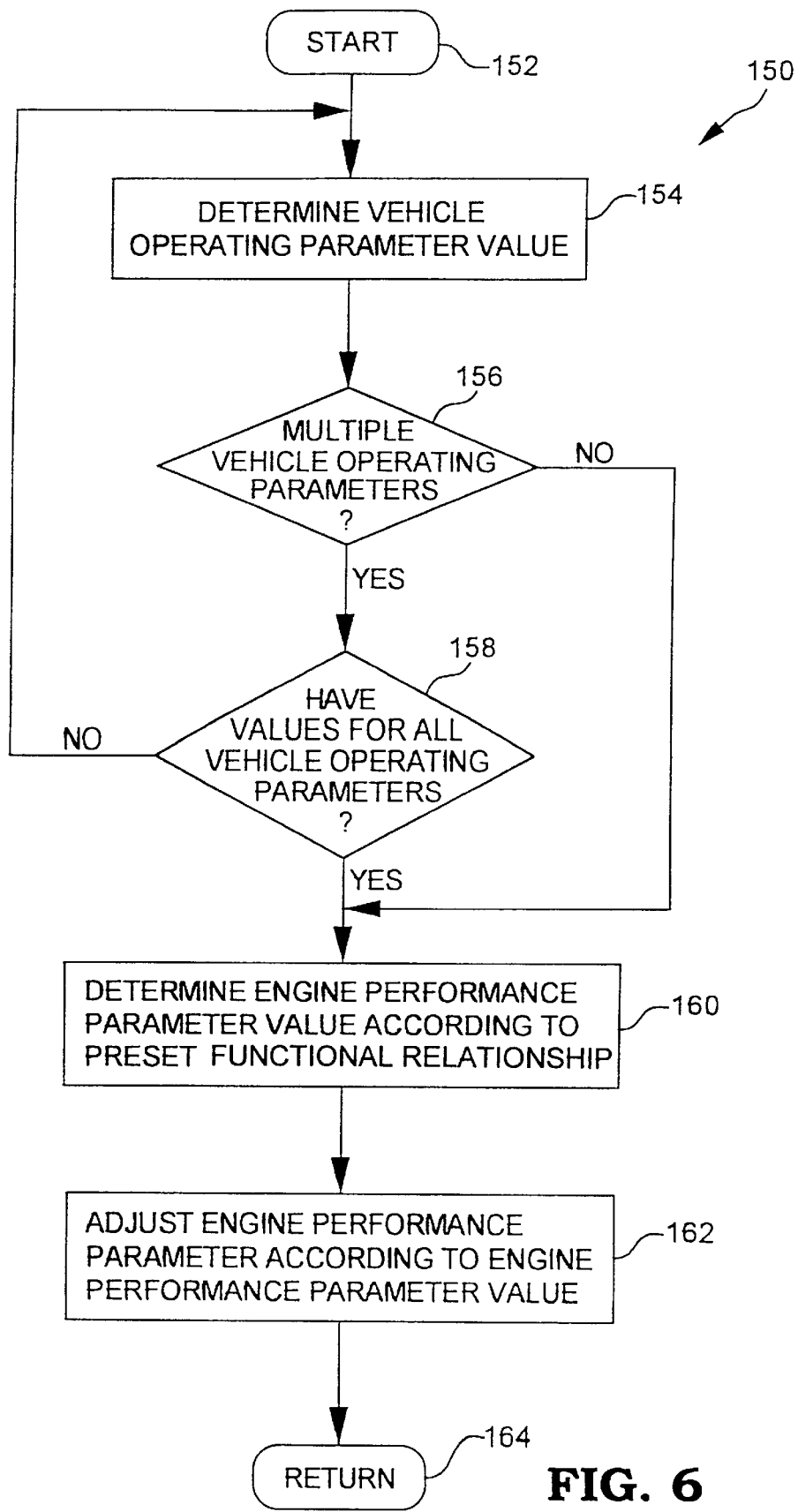
FIG. 6 is a flowchart illustrating one embodiment of a software algorithm for controlling engine performance in accordance with the present invention.

Referring now to FIG. 6, a flowchart is shown illustrating one embodiment of a software algorithm 150 for operating control system 10 in accordance with either of the embodiments illustrated in FIGS. 2A–2C and 3A–3C. Preferably, algorithm 150 executes several times per second to thereby continuously monitor vehicle operation parameter values or states and adjust available engine performance according to the concepts described herein. Algorithm 150 starts at step 152, and at step 154 determines a present operational state or value, in a manner discussed hereinabove, of one of the vehicle operating parameters established by algorithm 100 of FIG. 5. Thereafter at step 156, algorithm 150 tests whether multiple vehicle operating parameters were programmed into memory 14. If not, algorithm execution continues at step 160. If multiple vehicle operating parameters are required, algorithm execution continues at step 158 where algorithm 150 tests whether operational states or values for all vehicle operating parameters have been determined. If not, algorithm execution loops back to step 154 where an operational state or value of another vehicle operating parameter is determined by control system 10.

If only single vehicle operating parameter is detected as being required at step 156, or if operational states or values have been determined for all vehicle operating parameters at step 158, algorithm execution continues at step 160 where a value for the engine performance parameter programmed in memory 14 is determined in accordance with the preset functional relationship between the engine performance parameter and the one or more vehicle operating parameters. Thereafter at step 162, control computer 12 adjusts the engine performance parameter according to the engine performance parameter value determined at step 160 to thereby establish the available engine performance level of subsequent operation of engine 32. Thereafter at step 164, algorithm execution returns to its calling routine.

Figure 7:
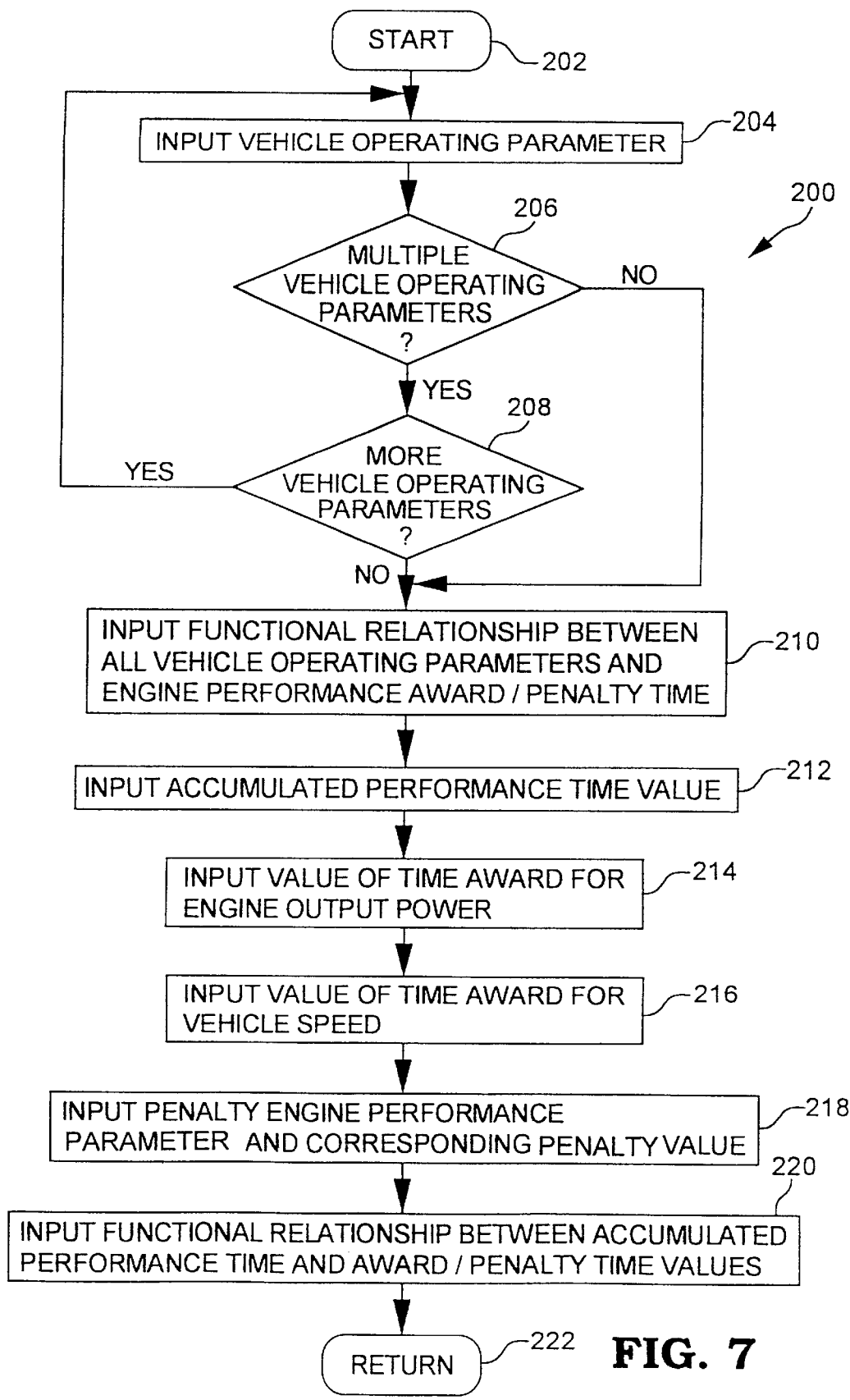
FIG. 7 is a flowchart illustrating another embodiment of a software algorithm for programming a vehicle control computer for operation in accordance with the present invention.

Referring now to FIG. 7, a flowchart is shown illustrating one embodiment of a software algorithm 200 for programming memory 14 of control computer 12 for subsequent operation of control system 10 in accordance with the embodiment illustrated in FIGS. 4A–4C. Algorithm 200 starts at step 202, and at step 204 a vehicle operating parameter is input into memory 14 of control computer 12. Thereafter at step 206, algorithm 200 tests whether multiple vehicle operating parameters are required. If so, algorithm execution continues at step 208, and if only a single vehicle operating parameter is required, algorithm execution continues at step 210. If multiple vehicle operating parameters are required, algorithm 200 tests, at step 208, whether all vehicle operating parameters have been input or whether more vehicle operating parameters are required. If more vehicle operating parameters are required at step 208, algorithm execution loops back to step 204 where an additional vehicle operating parameter is programmed into memory 14 of control computer 12.

If no additional vehicle operating parameters are required at step 208, or if only a single vehicle operating parameter is required at step 206, a functional relationship between all vehicle operating parameters and engine performance award/penalty time is programmed into memory 14 at step 210. Thereafter at step 212, a time value of accumulated performance time is programmed into memory 14. In accordance with yet another aspect of the present invention, performance time is permitted to accumulate within any given trip, and from trip to trip. Since drivers of fleet vehicles do not necessarily drive the same vehicle trip after trip, step 212 provides the fleet owner/manager with the flexibility to provide any driver's current vehicle with that driver's accumulated performance time value. Moreover, step 212 provides the fleet owner/manager with further flexibility to program "bonus" award time, assess additional penalty time or reset the accumulated performance time value for reasons which may be related or unrelated to driver performance.

From step 212, algorithm execution continues to step 214 where an incremental time award value for increased engine output power is programmed into memory 14. Thereafter at step 216, an incremental time award value for increased vehicle speed is programmed into memory 14. Steps 214 and 216 are intended for operation of control system 10 in accordance with the display/interface embodiment of FIG. 4C wherein the driver is permitted to select between available engine output power and available vehicle speed as the performance enhancement reward. Those skilled in the art will recognize that a corresponding one of steps 214 and 216 may be omitted if such a driver option is not included.

From step 216, algorithm execution continues at step 218 where a penalty engine performance parameter and corresponding time penalty therefore are programmed into memory 14. Step 218 thus provides the fleet owner/manager with further flexibility in that the penalty engine performance parameter input thereat may be different than the reward engine performance parameter input at either of steps 214 or 216. As an operational example, a programmer may wish to reward the driver with an increase in available vehicle speed and penalize the driver with a decrease in available engine output power.

From step 218, algorithm execution continues at step 220 wherein a functional relationship between accumulated performance time and the award and penalty times is programmed into memory 14. As discussed hereinabove, this functional relationship may be as simple as a subtraction of penalty time from award time, or may be some other more complicated function of the award/penalty times. In any case, algorithm execution continues from step 220 to step 222 where algorithm execution is returned to its calling routine.

Figure 8:
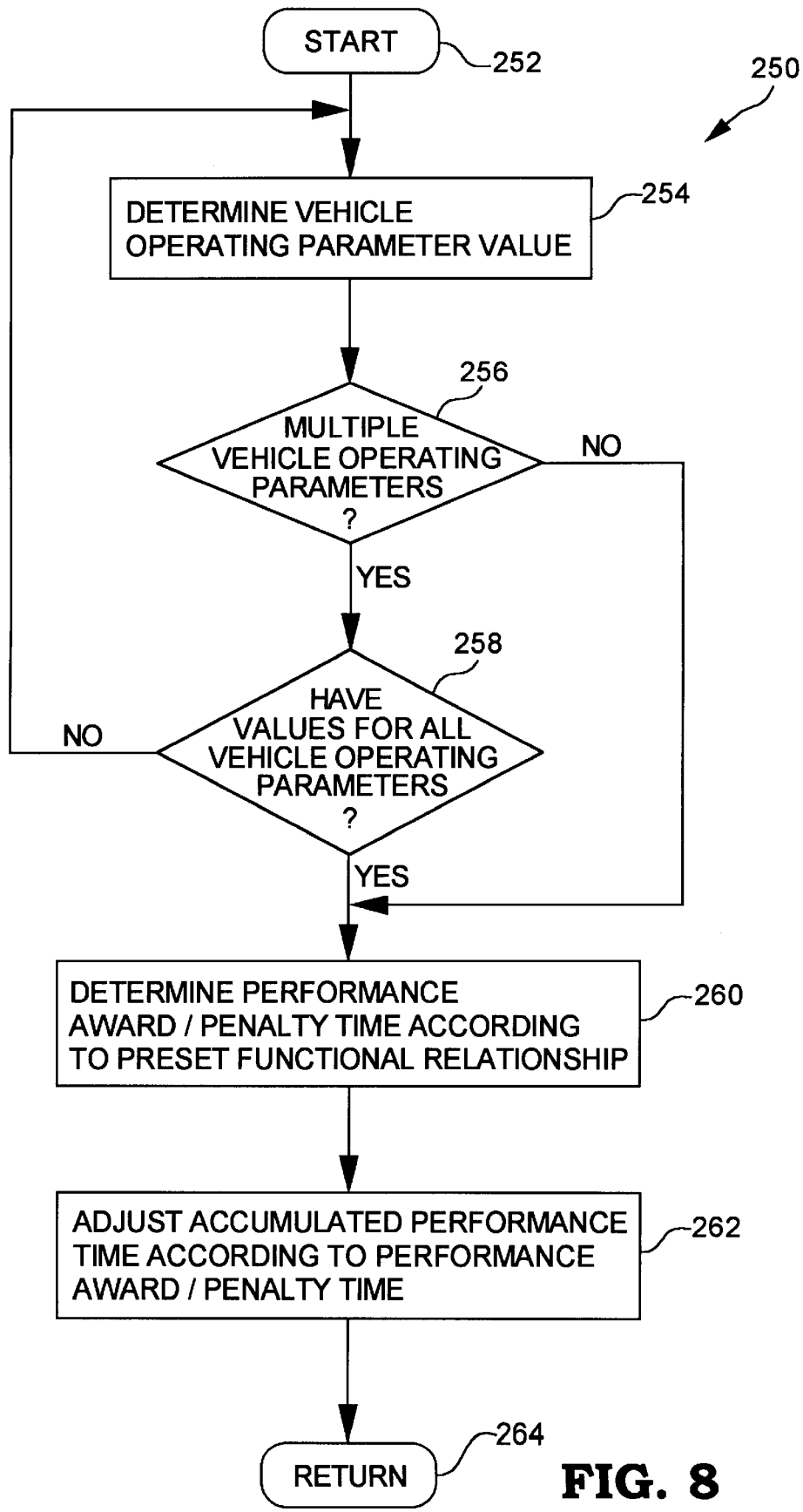
FIG. 8 is a flowchart illustrating one embodiment of a software algorithm for controlling accumulated performance time in accordance with the present invention.

Referring now to FIG. 8, a flowchart is shown illustrating one embodiment of a software algorithm 250 for monitoring one or more vehicle operating parameters and computing accumulated award/penalty time in accordance with the embodiment illustrated in FIGS. 4A–4C. Preferably, algorithm 250 executes several times per second to thereby continuously monitor vehicle operating parameters and compute accumulated award/penalty time according to the concepts described herein. Algorithm 250 starts at step 252, and at step 254 determines a present operational state or value, in a manner discussed hereinabove, of one of the vehicle operating parameters established by algorithm 200 of FIG. 7. Thereafter at step 256, algorithm 250 tests whether multiple vehicle operating parameters were programmed into memory 14. If not, algorithm execution continues at step 260. If multiple vehicle operating parameters are required, algorithm execution continues at step 258 where algorithm 250 tests whether operational states or values for all vehicle operating parameters have been determined. If not, algorithm execution loops back to step 254 where an operational state or value of another vehicle operating parameter is determined by control system 10.

If only single vehicle operating parameter is detected as being required at step 256, or if operational states or values have been determined for all vehicle operating parameters at step 258, algorithm execution continues at step 260 where a value for the engine performance award or penalty is determined according to the functional relationship therebetween which was established in the programming algorithm of FIG. 7. Thereafter at step 262, control computer 12 adjusts the accumulated performance time according to the computation resulting from step 260 and according to the functional relationship between accumulated performance time and award/penalty times previously programmed into memory 14. Thereafter at step 264, algorithm execution is returned to its calling routine.

Figure 9A:
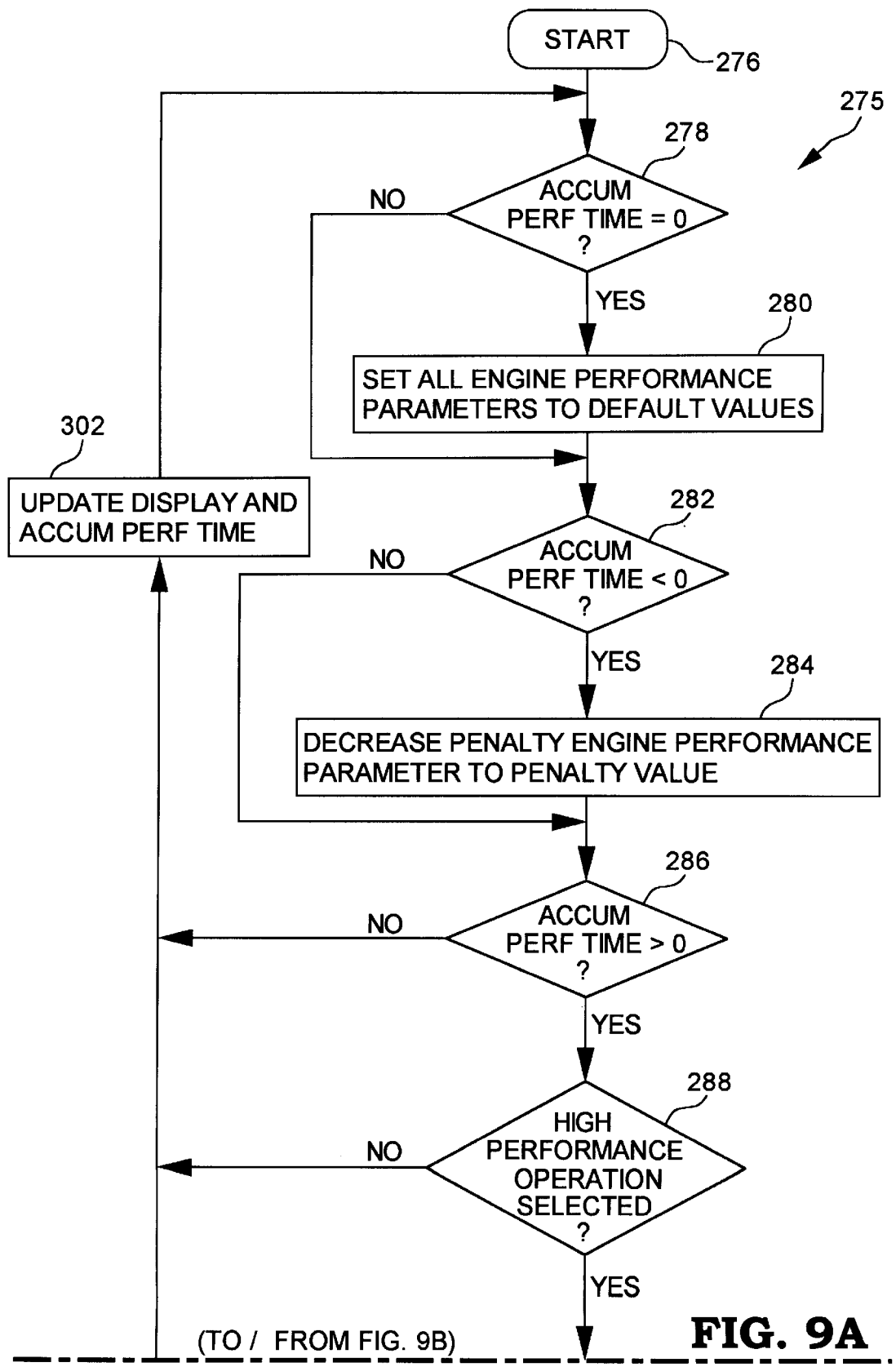
FIGS. 9A and 9B illustrate a flowchart of one embodiment of a software algorithm for controlling engine performance based on accumulated performance time in accordance with the present invention.
Figure 9B:
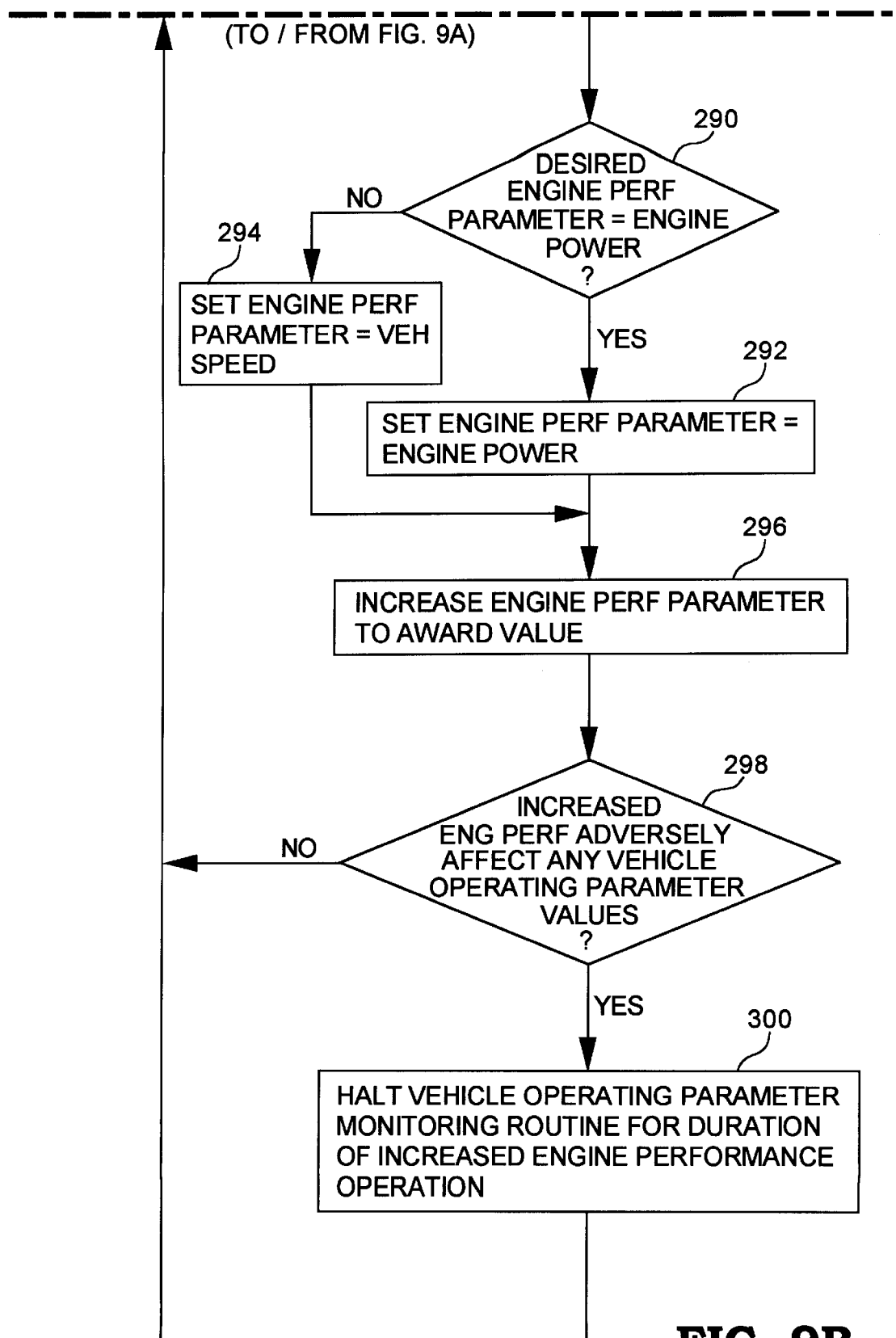

Referring now to FIGS. 9A and 9B, a flowchart is shown illustrating one embodiment of a software algorithm 275 for operating control system 10 in accordance with the embodiment illustrated in FIGS. 4A–4C. Preferably, algorithm 275 executes several times per second to thereby continuously monitor display/interface 40 and adjust available engine performance according to the accumulated performance time. Algorithm 275 starts at step 276, and at step 278 control computer 12 tests the value of accumulated performance time. If, at step 278, the accumulated performance time is equal to a predetermined value, preferably zero, algorithm execution continues at step 280 where all engine performance parameters defined in the programming algorithm of FIG. 7 are set to their default values. If, at step 278, the accumulated performance time is not equal to zero, or after execution of step 280, control computer again tests the value of the accumulated performance time at step 282. If, at step 282, accumulated performance time is less than a predefined value, preferably zero, algorithm execution continues at step 284 where the penalty engine performance parameter is set to the penalty value, wherein the penalty engine performance parameter and the penalty value have been previously programmed into memory 14. Coincident with the execution of step 284, the real time is added to the accumulated performance time according to the real time clock/counter 16. In this manner, penalty engine performance is decreased for the duration that the accumulated performance time is less than zero, which duration corresponds to penalty time assessed by the functional relationship established between accumulated performance time and a penalty time value that is programmed into memory 14, an example of which is set forth in Table II above.

If, at step 282, accumulated performance time is greater than or equal to zero, or after execution of step 284, algorithm execution continues at step 286 where accumulated performance time is once more tested. If, at step 286, accumulated performance time is greater than zero, algorithm execution continues at step 288. If accumulated performance time is less than or equal to zero at step 286, algorithm execution continues at step 302 where the display/interface 40 and accumulated performance time is updated with present values thereof. An accumulated performance time of greater than zero corresponds, as discussed hereinabove, to an award time of increased engine performance which remains accumulated until driver selection thereof.

At step 288, control computer 12 tests whether high engine performance operation has been selected by the driver which, in one embodiment, corresponds to driver actuation of switch 44 of FIGS. 4A–4C. It is to be understood, however, that the driver may alternatively select such increased engine performance by actuating an equivalent switch located at some convenient location within the cab area of the vehicle.

In any event, if high engine performance operation has not been selected at step 288, algorithm execution continues at step 302. If, on the other hand, high engine performance operation has been selected at step 288, algorithm execution continues at step 290 where control computer 12 tests whether the desired engine performance parameter for increased engine performance operation is available engine output power or available vehicle speed which, in one embodiment, corresponds to driver actuation of either switch 46 or 48 respectively of FIG. 4C. However, as with switch 44, it is to be understood that the driver may alternatively select between such manifestation of increased engine performance by actuating equivalent switches located at some convenient location within the cab area of the vehicle. In any case, if, at step 290, the desired engine performance parameter is increased available engine output power, the algorithm execution continues at step 292 where the engine performance parameter is set equal to engine output power. If, at step 290, the desired engine performance parameter is increased available vehicle speed, algorithm execution continues at step 294 where the engine performance parameter is set equal to vehicle speed.

Algorithm execution continues from either of steps 292 or 294 to step 296 where control computer 12 increases the engine performance parameter to the award value previously programmed into memory 14 and begins incrementally removing real time from the accumulated performance time as discussed hereinabove. Real time clock/counter 16 continues to remove time from the accumulated performance time until the accumulated performance time reaches zero or the driver deactuates switch 44.

From step 296, algorithm execution continues at step 298 where control computer 298 tests whether the currently increased engine performance has an adverse impact on any of the currently monitored vehicle operating parameter values. If not, algorithm execution continues at step 302. If so, however, control computer 12 is operable to temporarily halt execution of the vehicle parameter monitoring routine of FIG. 8 for the duration of increased engine performance operation. Algorithm execution continues therefrom at step 302. From step 302, algorithm execution loops back to step 278 where algorithm 275 restarts.

Steps 298 and 300 are intended to deal with the situation whereby a driver is rewarded for operation of the vehicle in accordance with vehicle operational goals, yet the reward, in the form of either increased available engine output power or increased available vehicle speed, causes the vehicle to operate in a manner inconsistent with the vehicle operational goals. Without steps 298 and 300, such an operational reward may lead directly to an operational penalty as discussed hereinabove. Steps 298 and 300 ensure that such a penalty does not result by temporarily halting algorithm 250 of FIG. 8.

The present invention is illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the flowcharts of FIGS. 5–9B are intended to illustrate example algorithms for carrying out some of the concepts of the present invention described therein. Those skilled in the art will recognize that other algorithms different in structure can be devised to carry out the same functions described therein without detracting from the scope of the present invention.

What is claimed is:

1. A system for controlling internal combustion engine performance in a motor vehicle, comprising:

means for receiving input data signals which represent a vehicle operating parameter and a functional relationship between said vehicle operating parameter and an engine performance parameter;

means for monitoring the value of said vehicle operating parameter; and means for adjusting said engine performance parameter based on said monitored vehicle operating parameter value according to said functional relationship.

2. The system of claim 1 wherein said means for adjusting said engine performance parameter includes means for increasing available engine performance if said monitored vehicle operating parameter is consistent with a predefined fuel economy goal, and for decreasing available engine performance if said monitored vehicle operating parameter is inconsistent with said predefined fuel economy goal.

3. The system of claim 1 wherein said set of input data signals are provided via a wireless communications device.

4. The system of claim 1 wherein said vehicle operating parameter corresponds to engine idle time;

and wherein said means for monitoring the value of said vehicle operating parameter includes a vehicle speed sensor operable to sense vehicle speed and produce a vehicle speed signal corresponding thereto;

and wherein said means for adjusting said engine performance parameter is responsive to said vehicle speed signal to increase available engine performance if said vehicle speed signal corresponds to an engine idling state for less than a percentage of time of a predetermined time interval of motor vehicle operation, and to decrease available engine performance if said vehicle speed signal corresponds to said engine idling state for more than said percentage of time of said predetermined time interval of motor vehicle operation.

5. The system of claim 1 wherein said vehicle operating parameter corresponds to engine idle time;

and wherein said means for monitoring the value of said vehicle operating parameter includes means for sensing a position of a manually actuatable throttle in the vehicle and producing a throttle position signal corresponding thereto;

and wherein said means for adjusting said engine performance parameter is responsive to said throttle position signal to increase available engine performance if said throttle position signal indicates a throttle position corresponding to an engine idling state for less than a percentage of time of a predetermined time interval of motor vehicle operation, and to decrease available engine performance if said throttle position signal indicates a throttle position corresponding to said engine idling state for more than said percentage of time of a predetermined time interval of motor vehicle operation.

6. The system of claim 1 wherein said vehicle operating parameter corresponds to engine idle time;

and wherein said means for monitoring the value of said vehicle operating parameter includes means for sensing the position of an idle validation switch operatively connected to a manually actuatable throttle in the vehicle and producing an idle validation switch status signal corresponding thereto;

and wherein said means for adjusting said engine performance parameter is responsive to said idle validation switch status signal to increase available engine performance if said idle validation switch status signal corresponds to the active state thereof for less than a percentage of time of a predetermined time interval of motor vehicle operation, and to decrease available engine performance if said idle validation switch status signal corresponds to the active state thereof for more than said percentage of time of said predetermined time interval of motor vehicle operation.

7. The system of claim 1 wherein said vehicle operating parameter corresponds to excessive engine speed time;

and wherein said means for monitoring the value of said vehicle operating parameter includes an engine speed sensor operable to sense engine speed and produce an engine speed signal corresponding thereto;

and wherein said means for adjusting said engine performance parameter is responsive to said engine speed signal to increase available engine performance if said engine speed signal exceeds an excessive engine speed threshold for less than a percentage of time of a predetermined time interval of motor vehicle operation, and to decrease available engine performance if said engine speed signal exceeds said excessive engine speed threshold for more than said percentage of time of said predetermined time interval of motor vehicle operation.

8. The system of claim 1 wherein said vehicle operating parameter corresponds to a distance traveled by the vehicle per unit of fuel used by the engine;

and wherein said means for monitoring the value of said vehicle operating parameter includes means for determining a distance traveled by the vehicle per unit of fuel used by the engine and producing a fuel usage signal corresponding thereto;

and wherein said means for adjusting said engine performance parameter is responsive to said fuel usage signal to increase available engine performance if said fuel usage signal corresponds to fuel usage above a predetermined fuel usage level, and to decrease available engine performance if said fuel usage signal corresponds to fuel usage below a predetermined fuel usage level.

9. The system of claim 1 wherein said vehicle operating parameter corresponds to a vehicle traveling distance wherein a numerically higher gear of a transmission in the vehicle is engaged with the engine;

and wherein said means for monitoring the value of said vehicle operating parameter includes means for determining a gear of the transmission presently engaged with the engine and producing a gear engaged signal corresponding thereto;

and wherein said means for adjusting said engine performance parameter is responsive to said gear engaged signal to increase available engine performance if said gear engaged signal indicates engagement of the engine with said numerically highest transmission gear for more than a predetermined vehicle traveling distance, and to decrease available engine performance if said gear engaged signal indicates engagement of the engine with said numerically highest transmission gear for less than the predetermined vehicle traveling distance.

10. The system of claim 1 wherein said vehicle operating parameter corresponds to rapid deceleration rate;

and wherein said means for monitoring the value of said vehicle operating parameter includes a vehicle speed sensor operable to sense vehicle speed and produce a vehicle speed signal corresponding thereto;

and wherein said means for adjusting said engine performance parameter is responsive to said vehicle speed signal to compute a vehicle deceleration rate and increase available engine performance if the vehicle deceleration rate exceeds a rapid deceleration rate less than a predefined number of times over a predetermined time interval, and decrease available engine performance if the vehicle deceleration rate exceeds said rapid deceleration rate more than said predefined number of times over said predetermined time interval.

11. The system of claim 1 wherein said vehicle operating parameter corresponds to average vehicle speed;

and wherein said means for monitoring the value of said vehicle operating parameter includes means for sensing vehicle speed, computing an average vehicle speed over a predetermined time interval of engine operations, and producing an average vehicle speed signal corresponding thereto;

and wherein said means for adjusting said engine performance parameter is responsive to said average vehicle speed signal to increase available engine performance if said average vehicle speed signal corresponds to an average vehicle speed below a predefined vehicle speed threshold during engine operation, and to decrease available engine performance if said average vehicle speed signal corresponds to an average vehicle speed above a predefined vehicle speed threshold during engine operation.

12. The system of claim 1 wherein said vehicle operating parameter corresponds to vehicle acceleration rate;

and wherein said means for monitoring the value of said vehicle operating parameter includes means for monitoring vehicle acceleration rate and producing a vehicle acceleration rate signal corresponding thereto;

and wherein said means for adjusting said engine performance parameter is responsive to said vehicle acceleration rate signal to increase available engine performance if said vehicle acceleration rate signal exceeds a predefined vehicle acceleration rate less than a predetermined number of times over a predefined time period, and to decrease available engine performance if said vehicle acceleration rate signal exceeds said predefined vehicle acceleration rate more than said predetermined number of times over said predefined time period.

13. A system for controlling internal combustion engine performance in a motor vehicle, comprising:

means for monitoring the value of a driver-controllable vehicle operating parameter corresponding to one of engine idle time, engine speed, vehicle mileage per unit of fuel, transmission gear selection, vehicle acceleration and vehicle speed; and a control computer responsive to said vehicle operating parameter value to adjust available engine performance according to a predefined functional relationship between said vehicle operating parameter and an engine performance parameter, said control computer having established therein a minimum engine performance parameter value below which said available engine performance cannot be adjusted.

14. The system of claim 13 wherein said engine performance parameter corresponds to one of available engine output power and available vehicle speed.

15. The system of claim 13 wherein said monitoring means includes means for determining the value of said vehicle operating parameter over a first predefined time interval, and wherein said control computer includes means for adjusting available engine performance for a second predefined time interval, whereby engine performance during said second time interval is controlled in accordance with driver behavior during said first time interval as an incentive for operation of the vehicle in furtherance of established vehicle operating goals.

16. The system of claim 15 wherein said means for adjusting available engine performance includes means for alternatively increasing and decreasing available engine performance.

* * * * *